United States Patent
Ori

(10) Patent No.: US 7,630,138 B2
(45) Date of Patent: Dec. 8, 2009

(54) VARIABLE-POWER OPTICAL SYSTEM AND IMAGING DEVICE

(75) Inventor: Tetsuya Ori, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 0 days.

(21) Appl. No.: 12/051,672

(22) Filed: Mar. 19, 2008

(65) Prior Publication Data
US 2008/0239506 A1 Oct. 2, 2008

(30) Foreign Application Priority Data
Mar. 28, 2007 (JP) .............................. P2007-084086
Jul. 2, 2007 (JP) .............................. P2007-174314

(51) Int. Cl.
*G02B 15/14* (2006.01)

(52) U.S. Cl. ..................... 359/676; 359/726; 359/687; 396/72; 348/240.3; 348/344

(58) Field of Classification Search ................ 359/676, 359/686, 687, 726–729; 396/72–88; 348/240.99–240.3, 348/335–369
See application file for complete search history.

(56) References Cited

U.S. PATENT DOCUMENTS

| 7,110,186 | B2 * | 9/2006 | Sueyoshi | 359/676 |
| 7,253,962 | B2 * | 8/2007 | Sano | 359/684 |
| 7,365,911 | B2 * | 4/2008 | Yamashita et al. | 359/676 |
| 2006/0066955 | A1 | 3/2006 | Satori et al. | |
| 2006/0238886 | A1 | 10/2006 | Kushida et al. | |
| 2006/0274426 | A1 * | 12/2006 | Sueyoshi | 359/676 |
| 2007/0109661 | A1 * | 5/2007 | Bito et al. | 359/676 |
| 2007/0139786 | A1 * | 6/2007 | Iwasawa | 359/676 |
| 2008/0247053 | A1 * | 10/2008 | Iwasawa | 359/676 |

FOREIGN PATENT DOCUMENTS

| CN | 1797060 A | 5/2006 |
| EP | 1 677 134 A1 | 7/2006 |
| JP | 4-281419 A | 10/1992 |
| JP | 3196283 B2 | 6/2001 |
| JP | 2006-98686 A | 4/2006 |
| JP | 2006-209100 A | 8/2006 |
| JP | 2006-301543 A | 11/2006 |
| JP | 2006-323051 A | 11/2006 |

* cited by examiner

*Primary Examiner*—Darryl J Collins
(74) *Attorney, Agent, or Firm*—Birch, Stewart, Kolasch & Birch, LLP

(57) ABSTRACT

A variable-power optical system includes, in order from an object side, first to fifth lens groups. The first and third lens groups are fixed at a time of varying magnification and at a time of focusing. The second, fourth and fifth lens groups are movable at the time of varying magnification. The first, third and fourth lens groups have positive refractive powers. The second and fifth lens groups have negative refractive powers. The fourth lens group has a focusing function. The following conditional expressions are satisfied.

$$0.4 < fw/f1 < 0.8$$

$$0.5 < |f2/fw| < 0.8$$

where fw denotes a focal length of the whole system at an wide end, f1 denotes a focal length of the first lens group, and f2 denotes a focal length of the second lens group.

20 Claims, 30 Drawing Sheets

EXAMPLE 1 (WIDE END)

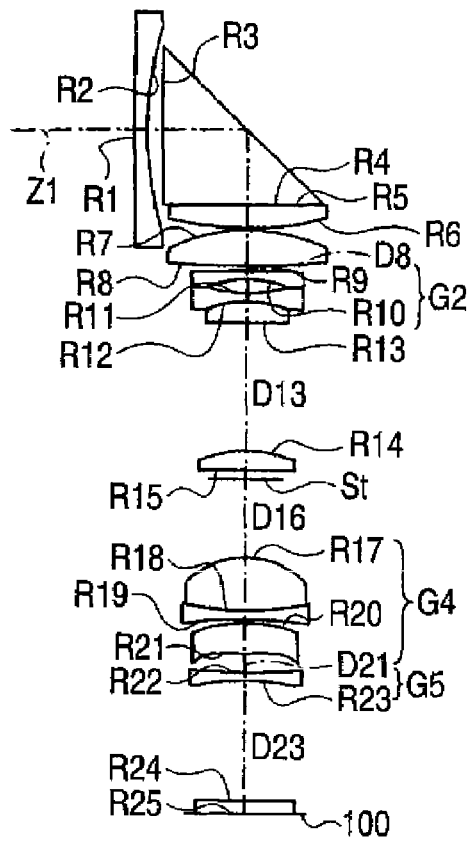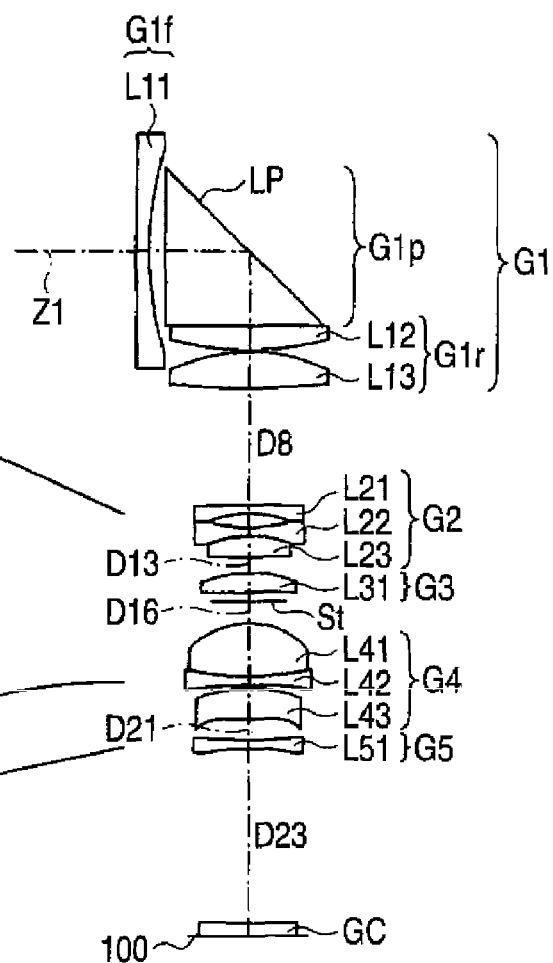
FIG. 1A EXAMPLE 1 (WIDE END)
FIG. 1B EXAMPLE 1 (TELEPHOTO END)

EXAMPLE 2 (WIDE END)

EXAMPLE 2 (TELEPHOTO END)

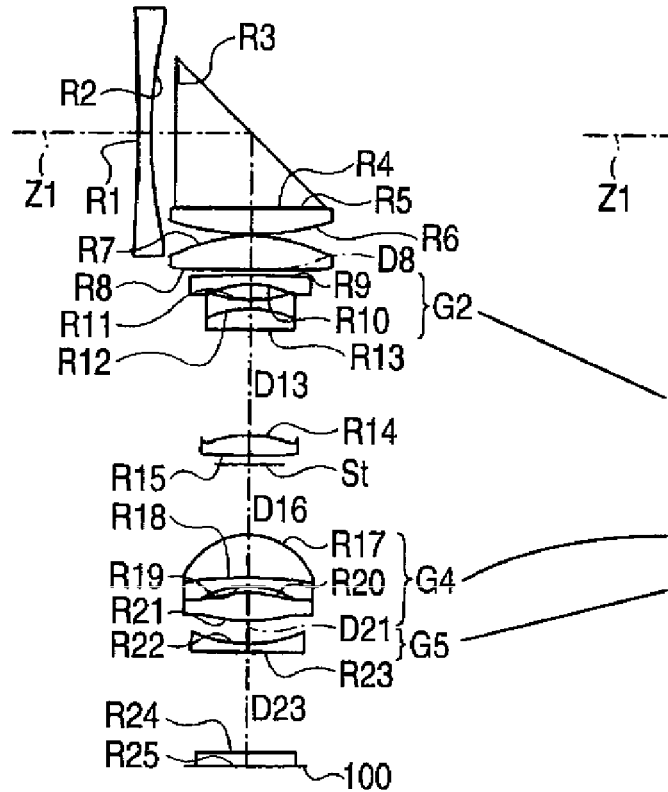
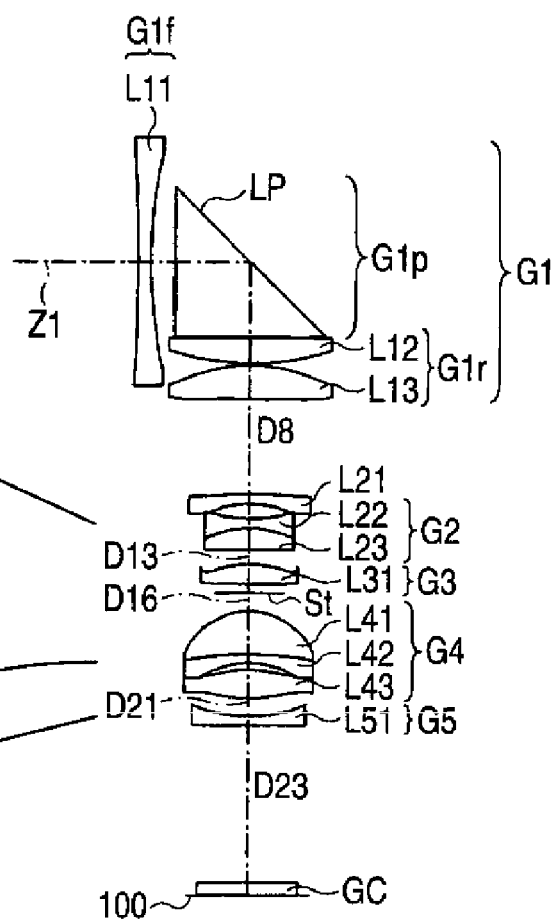
FIG. 3A
EXAMPLE 3 (WIDE END)
FIG. 3B
EXAMPLE 3 (TELEPHOTO END)

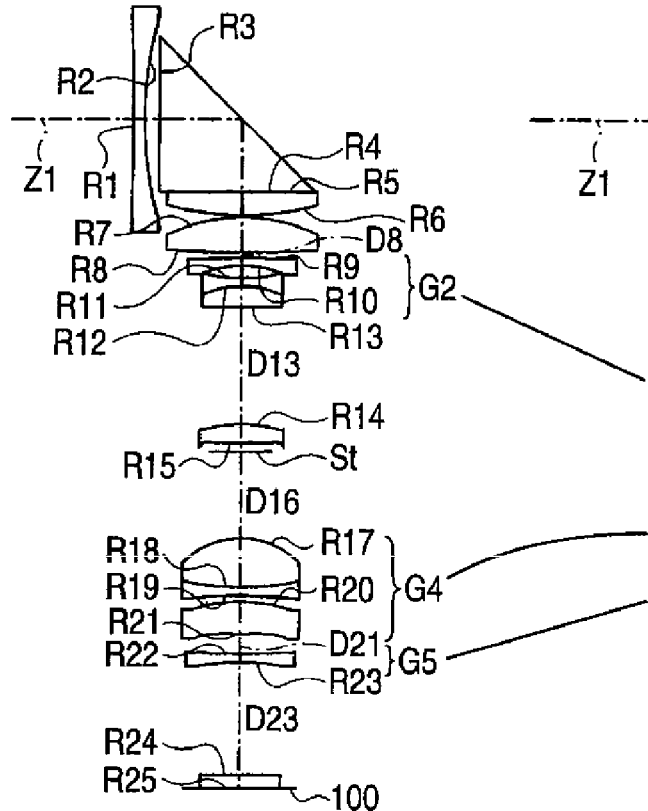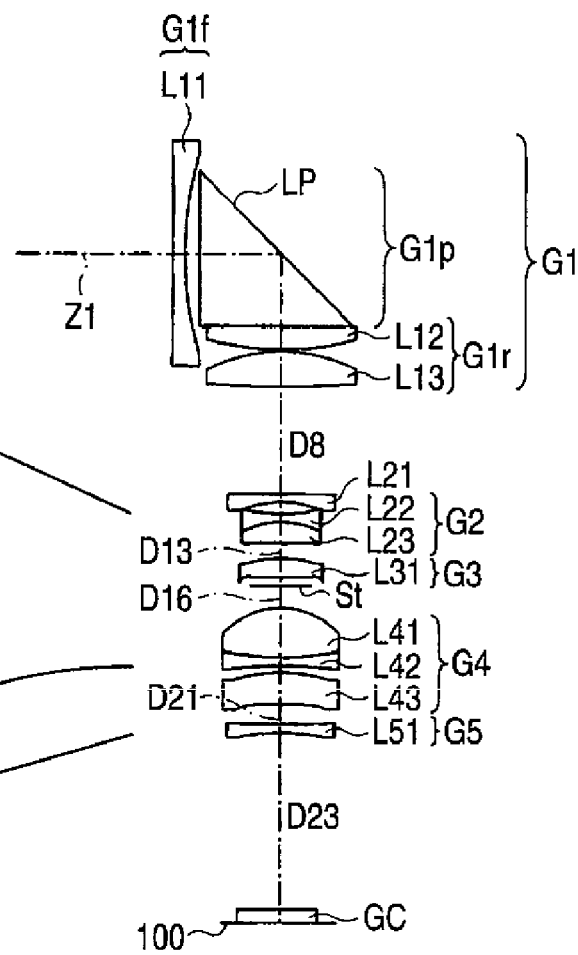
FIG. 4A EXAMPLE 4 (WIDE END)
FIG. 4B EXAMPLE 4 (TELEPHOTO END)

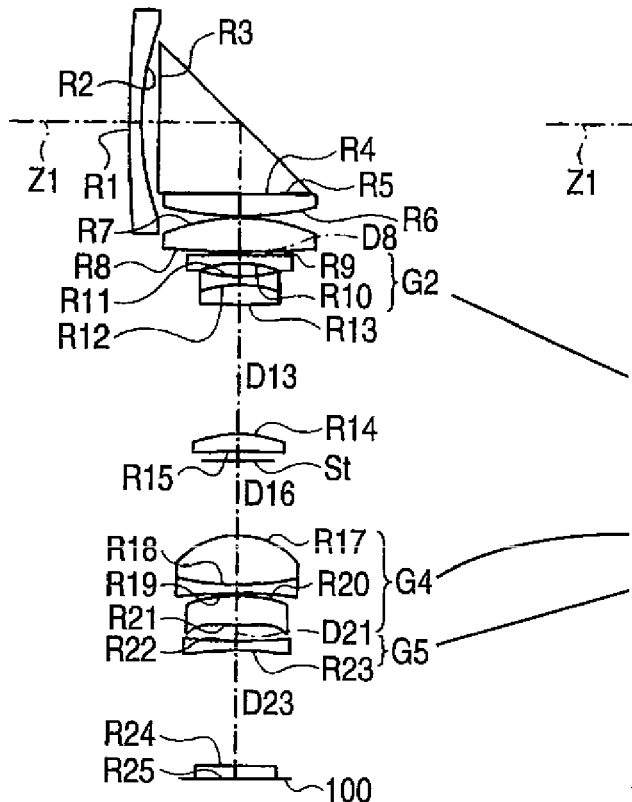
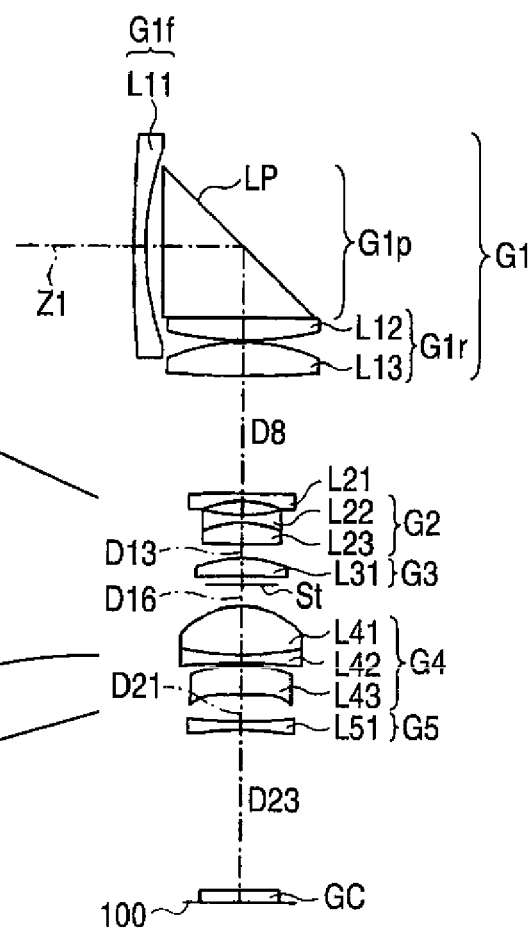
FIG. 5A
EXAMPLE 5 (WIDE END)
FIG. 5B
EXAMPLE 5 (TELEPHOTO END)

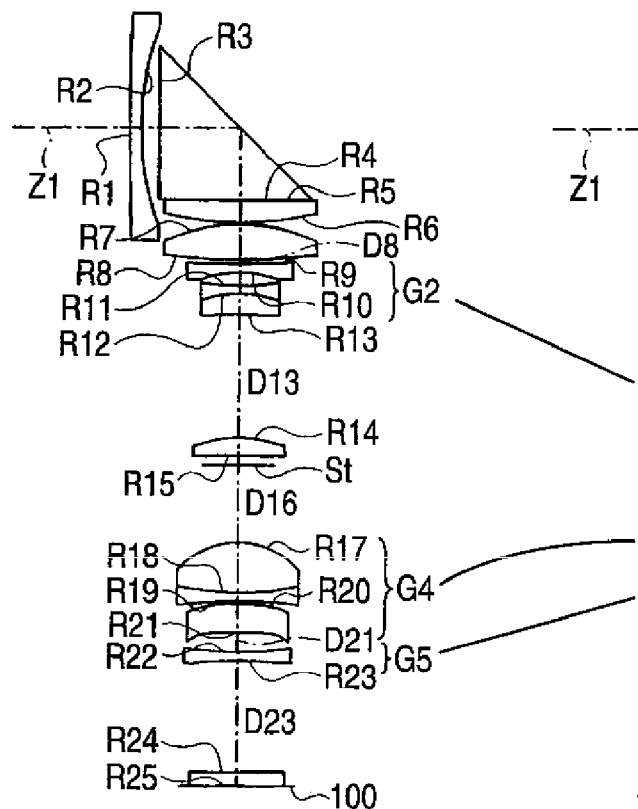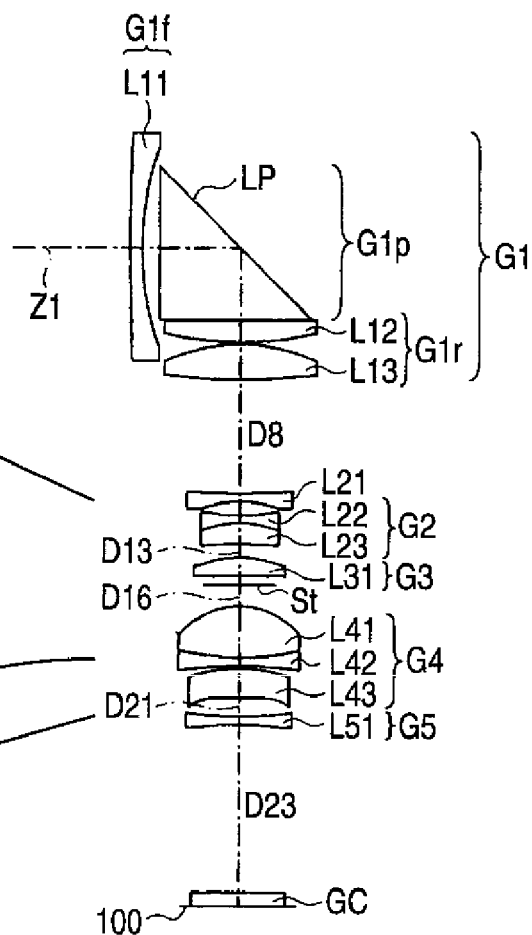
FIG. 6A EXAMPLE 6 (WIDE END)
FIG. 6B EXAMPLE 6 (TELEPHOTO END)

EXAMPLE 7 (WIDE END)

EXAMPLE 7 (TELEPHOTO END)

FIG. 9A

| | EXAMPLE 1 BASIC LENS DATA | | | | |
|---|---|---|---|---|---|
| | Si (SURFACE NUMBER) | Ri (CURVATURE RADIUS) | Di (SURFACE SEPARATION) | Ndi (REFRACTIVE INDEX) | νdj (ABBE NUMBER) |
| G1f | 1 | 544.9634 | 0.79 | 1.92286 | 20.9 |
| | 2 | 21.9196 | 1.04 | 1.00000 | |
| G1p | 3 | ∞ | 10.10 | 1.78590 | 44.2 |
| | 4 | ∞ | 0.05 | 1.00000 | |
| G1r | 5 | ∞ | 1.50 | 1.49700 | 81.6 |
| | 6 | -19.5687 | 0.10 | 1.00000 | |
| | *7 | 11.0413 | 2.30 | 1.58809 | 60.4 |
| | *8 | -51.5340 | D8 (VARIABLE) | 1.00000 | |
| G2 | 9 | 120.5725 | 0.52 | 1.88300 | 40.8 |
| | 10 | 6.4970 | 0.90 | 1.00000 | |
| | 11 | -9.1352 | 0.53 | 1.88300 | 40.8 |
| | 12 | 6.9120 | 1.36 | 1.92286 | 18.9 |
| | 13 | -78.4027 | D13 (VARIABLE) | 1.00000 | |
| G3 | *14 | 7.4643 | 1.20 | 1.50957 | 56.5 |
| | *15 | 100.1569 | 0.60 | 1.00000 | |
| | 16 (APERTURE STOP) | — | D16 (VARIABLE) | 1.00000 | |
| G4 | 17 | 5.2081 | 3.37 | 1.48749 | 70.2 |
| | 18 | -18.0000 | 0.55 | 1.92286 | 20.9 |
| | 19 | 28.4745 | 0.23 | 1.00000 | |
| | *20 | 10.4177 | 1.91 | 1.50957 | 56.5 |
| | *21 | -60.2470 | D21 (VARIABLE) | 1.00000 | |
| G5 | 22 | -43.9849 | 0.55 | 1.83481 | 42.7 |
| | 23 | 15.8330 | D23 (VARIABLE) | 1.00000 | |
| GC | 24 | ∞ | 0.85 | 1.51680 | 64.2 |
| | 25 | ∞ | | | |

(*: ASPHERIC SURFACE) (f = 6.15~28.97mm, FNO. = 3.69~4.64, 2ω = 64.8°~13.8°)

FIG. 9B

| EXAMPLE 1 VARIABLE-SURFACE SEPARATION DATA | | |
|---|---|---|
| SURFACE SEPARATION | WIDE END (f = 6.15) | TELEPHOTO END (f = 28.97) |
| D8 | 0.31 | 7.47 |
| D13 | 8.14 | 0.97 |
| D16 | 5.01 | 1.44 |
| D21 | 1.24 | 1.34 |
| D23 | 7.73 | 11.20 |

FIG. 10

| EXAMPLE 1 ASPHERIC DATA | | | |
|---|---|---|---|
| ASPHERIC COEFFICIENT | SURFACE NUMBER | | |
| | 7TH SURFACE | 8TH SURFACE | 14TH SURFACE |
| K | 1.167164E10 - 01 | -1.000000E10 + 01 | 4.041006E10 - 01 |
| A3 | 5.149140E10 - 04 | 7.291592E10 - 04 | -1.187471E10 - 04 |
| A4 | -1.474152E10 - 04 | -3.439598E10 - 04 | 4.843777E10 - 05 |
| A5 | -1.269340E10 - 05 | 1.903151E10 - 05 | 3.882569E10 - 05 |
| A6 | 6.352727E10 - 06 | 8.215386E10 - 06 | -3.704132E10 - 04 |
| A7 | 1.228077E10 - 06 | 1.214757E10 - 06 | 1.300299E10 - 04 |
| A8 | 1.047500E10 - 08 | -7.536708E10 - 08 | 8.361979E10 - 05 |
| A9 | -4.734275E10 - 09 | -9.044842E10 - 08 | -1.384103E10 - 05 |
| A10 | -1.434312E10 - 08 | -1.317073E10 - 08 | -1.834070E10 - 05 |
| A11 | -2.088318E10 - 09 | -4.121821E10 - 09 | -3.410206E10 - 06 |
| A12 | 2.210465E10 - 11 | -6.396498E10 - 11 | 2.313419E10 - 06 |
| A13 | 1.066916E10 - 10 | 2.016753E10 - 10 | 1.303827E10 - 06 |
| A14 | 3.524507E10 - 11 | 7.741179E10 - 11 | -4.160453E10 - 07 |
| A15 | 6.334747E10 - 12 | 1.568732E10 - 11 | — |
| A16 | 2.557606E10 - 13 | 1.173289E10 - 12 | — |
| A17 | -2.766040E10 - 13 | -6.523851E10 - 13 | — |
| A18 | -1.060938E10 - 13 | -3.542525E10 - 13 | — |
| A19 | -2.040907E10 - 14 | -6.287426E10 - 14 | — |
| A20 | 6.633846E10 - 15 | 2.226122E10 - 14 | — |
| | 15TH SURFACE | 20TH SURFACE | 21ST SURFACE |
| K | -9.847013E10 + 00 | -2.266175E10 + 00 | 1.000000E10 + 01 |
| A3 | -3.880500E10 - 04 | 5.529843E10 - 04 | -2.587376E10 - 04 |
| A4 | 1.621741E10 - 03 | -7.674344E10 - 04 | 4.586330E10 - 03 |
| A5 | -2.434207E10 - 03 | 1.557426E10 - 03 | -1.760737E10 - 03 |
| A6 | 1.341633E10 - 03 | -8.237274E10 - 04 | 1.078183E10 - 03 |
| A7 | -2.853276E10 - 05 | 2.162149E10 - 04 | 1.133710E10 - 05 |
| A8 | -1.542179E10 - 04 | 2.917859E10 - 05 | -1.161338E10 - 04 |
| A9 | -2.058644E10 - 05 | -2.547511E10 - 05 | -2.108710E10 - 06 |
| A10 | 1.706266E10 - 05 | -2.498341E10 - 06 | 1.154962E10 - 05 |
| A11 | 7.227183E10 - 06 | 3.711897E10 - 06 | 1.126207E10 - 06 |
| A12 | -9.006005E10 - 07 | -5.867386E10 - 07 | -6.916730E10 - 07 |
| A13 | -1.557000E10 - 06 | — | — |
| A14 | 3.480265E10 - 07 | — | — |

FIG. 11A

| | | EXAMPLE 2 BASIC LENS DATA | | | |
|---|---|---|---|---|---|
| | Si (SURFACE NUMBER) | Ri (CURVATURE RADIUS) | Di (SURFACE SEPARATION) | Ndi (REFRACTIVE INDEX) | νdj (ABBE NUMBER) |
| G1f | 1 | 411.2536 | 0.79 | 1.92286 | 20.9 |
| G1f | 2 | 24.5802 | 1.60 | 1.00000 | |
| G1p | 3 | ∞ | 9.20 | 1.78590 | 44.2 |
| G1p | 4 | ∞ | 0.05 | 1.00000 | |
| G1r | 5 | ∞ | 1.60 | 1.49700 | 81.5 |
| G1r | 6 | -17.0141 | 0.10 | 1.00000 | |
| G1r | *7 | 8.6446 | 2.15 | 1.59170 | 60.7 |
| G1r | *8 | -103.1469 | D8 (VARIABLE) | 1.00000 | |
| G2 | 9 | 56.3309 | 0.58 | 1.88300 | 40.8 |
| G2 | 10 | 5.4540 | 1.10 | 1.00000 | |
| G2 | 11 | -6.6930 | 0.59 | 1.72916 | 54.7 |
| G2 | 12 | 6.8813 | 1.30 | 1.92286 | 18.9 |
| G2 | 13 | 40.3558 | D13 (VARIABLE) | 1.00000 | |
| G3 | *14 | 7.3179 | 1.20 | 1.51007 | 56.2 |
| G3 | *15 | -20.9474 | 0.50 | 1.00000 | |
| | 16 (APERTURE STOP) | — | D16 (VARIABLE) | 1.00000 | |
| G4 | 17 | 5.6722 | 2.19 | 1.72916 | 54.7 |
| G4 | 18 | 34.8407 | 0.55 | 1.92286 | 18.9 |
| G4 | 19 | 6.3629 | 0.67 | 1.00000 | |
| G4 | *20 | 23.1990 | 1.60 | 1.51007 | 56.2 |
| G4 | *21 | -8.2266 | D21 (VARIABLE) | 1.00000 | |
| G5 | 22 | -8.0000 | 0.60 | 1.51007 | 56.2 |
| G5 | 23 | -12.9299 | D23 (VARIABLE) | 1.00000 | |
| GC | 24 | ∞ | 0.85 | 1.51680 | 64.2 |
| GC | 25 | ∞ | | | |

(*: ASPHERIC SURFACE) (f = 6.41~18.09mm, FNO. = 3.71~4.42, 2ω = 62.8°~22.2°)

FIG. 11B

| EXAMPLE 2 VARIABLE-SURFACE SEPARATION DATA | | |
|---|---|---|
| SURFACE SEPARATION | WIDE END (f = 6.41) | TELEPHOTO END (f = 18.09) |
| D8 | 0.35 | 4.07 |
| D13 | 4.49 | 0.77 |
| D16 | 4.55 | 1.38 |
| D21 | 1.62 | 1.33 |
| D23 | 6.81 | 10.26 |

FIG. 12

| EXAMPLE 2 ASPHERIC DATA | | | |
|---|---|---|---|
| ASPHERIC COEFFICIENT | SURFACE NUMBER | | |
| | 7TH SURFACE | 8TH SURFACE | 14TH SURFACE |
| K | 1.085545E10 + 00 | -1.000361E10 + 01 | -6.375438E10 - 01 |
| A3 | 5.963563E10 - 04 | 1.060513E10 - 03 | -1.433161E10 - 04 |
| A4 | -1.651163E10 - 04 | -4.447796E10 - 04 | 5.013390E10 - 05 |
| A5 | -8.065293E10 - 05 | 4.681438E10 - 05 | -2.521130E10 - 04 |
| A6 | 2.699416E10 - 06 | 1.153444E10 - 05 | 3.020348E10 - 04 |
| A7 | -2.079138E10 - 07 | 1.173612E10 - 06 | -1.701390E10 - 04 |
| A8 | -6.953239E10 - 07 | -6.780643E10 - 07 | -1.405130E10 - 05 |
| A9 | -4.895990E10 - 08 | -1.868258E10 - 07 | 4.270699E10 - 05 |
| A10 | 1.663737E10 - 08 | 5.853261E10 - 09 | -1.066304E10 - 05 |
| A11 | 3.112694E10 - 09 | 1.161989E10 - 08 | 5.247175E10 - 07 |
| A12 | -9.866169E10 - 10 | -1.435628E10 - 09 | 6.187103E10 - 09 |
| | SURFACE NUMBER | | |
| | 15TH SURFACE | 20TH SURFACE | 21ST SURFACE |
| K | 4.69470510 + 00 | -6.506754E10 + 00 | 4.256588E10 + 00 |
| A3 | -1.142443E10 - 03 | -8.389323E10 - 04 | -5.157392E10 - 04 |
| A4 | 3.311499E10 - 03 | -1.332486E10 - 03 | 5.449246E10 - 04 |
| A5 | -3.542914E10 - 03 | -3.706951E10 - 04 | 2.214635E10 - 04 |
| A6 | 2.356337E10 - 03 | -1.015224E10 - 04 | -4.296025E10 - 04 |
| A7 | -7.047809E10 - 04 | 1.315194E10 - 04 | 2.265049E10 - 04 |
| A8 | -4.436000E10 - 05 | -1.757567E10 - 05 | 1.214615E10 - 05 |
| A9 | 8.777259E10 - 05 | -1.887424E10 - 05 | -2.431703E10 - 05 |
| A10 | -5.909898E10 - 07 | 2.229671E10 - 06 | -3.770145E10 - 06 |
| A11 | -1.716588E10 - 05 | 2.270470E10 - 06 | 4.026312E10 - 06 |
| A12 | 4.554543E10 - 06 | -3.433072E10 - 07 | -4.507613E10 - 07 |

FIG. 13A

| EXAMPLE 3 BASIC LENS DATA |||||
|---|---|---|---|---|
| Si (SURFACE NUMBER) | Ri (CURVATURE RADIUS) | Di (SURFACE SEPARATION) | Ndi (REFRACTIVE INDEX) | νdj (ABBE NUMBER) |
| 1  | -120.7750 | 0.79 | 1.92286 | 20.9 |
| 2  | 30.0689   | 1.51 | 1.00000 | |
| 3  | ∞         | 9.40 | 1.78590 | 44.2 |
| 4  | ∞         | 0.05 | 1.00000 | |
| 5  | ∞         | 1.60 | 1.49700 | 81.6 |
| 6  | -16.0308  | 0.10 | 1.00000 | |
| *7 | 9.5337    | 2.15 | 1.59170 | 60.7 |
| *8 | -406152.7 | D8 (VARIABLE) | 1.00000 | |
| 9  | 47.2780   | 0.58 | 1.88300 | 40.8 |
| 10 | 5.9413    | 0.95 | 1.00000 | |
| 11 | -8.6089   | 0.59 | 1.83481 | 42.7 |
| 12 | 6.6476    | 1.30 | 1.92286 | 18.9 |
| 13 | 462.9490  | D13 (VARIABLE) | 1.00000 | |
| *14 | 6.7230   | 1.20 | 1.50957 | 56.5 |
| *15 | -263.0515 | 0.60 | 1.00000 | |
| 16 (APERTURE STOP) | — | D16 (VARIABLE) | 1.00000 | |
| 17 | 4.3571    | 2.68 | 1.48749 | 70.2 |
| 18 | 22.1697   | 0.55 | 1.92286 | 20.9 |
| 19 | 5.6794    | 0.40 | 1.00000 | |
| *20 | 6.4914   | 1.77 | 1.50957 | 56.5 |
| *21 | -9.6801  | D21 (VARIABLE) | 1.00000 | |
| 22 | -8.4920   | 0.55 | 1.72916 | 54.7 |
| 23 | -1264.9684 | D23 (VARIABLE) | 1.00000 | |
| 24 | ∞         | 0.85 | 1.51680 | 64.2 |
| 25 | ∞         |      |         | |

Groupings: G1f {1,2}, G1p {3,4}, G1r {5,6,7,8} comprising G1; G2 {9-13}; G3 {14,15}; G4 {17-21}; G5 {22,23}; GC {24,25}.

(*: ASPHERIC SURFACE) (f = 6.44~24.26mm, FNO. = 3.72~4.58, 2ω = 62.8°~16.6°)

FIG. 13B

| EXAMPLE 3 VARIABLE-SURFACE SEPARATION DATA |||
|---|---|---|
| SURFACE SEPARATION | WIDE END (f = 6.44) | TELEPHOTO END (f = 24.26) |
| D8  | 0.33 | 5.95 |
| D13 | 6.52 | 0.90 |
| D16 | 4.41 | 1.13 |
| D21 | 1.46 | 1.21 |
| D23 | 6.35 | 9.88 |

FIG. 14

| EXAMPLE 3 ASPHERIC DATA | | | |
|---|---|---|---|
| ASPHERIC COEFFICIENT | SURFACE NUMBER | | |
| | 7TH SURFACE | 8TH SURFACE | 14TH SURFACE |
| K | 9.220866E10 - 01 | 2.089580E10 + 07 | -7.566823E10 + 00 |
| A3 | 2.557967E10 - 04 | 4.359850E10 - 04 | -4.355715E10 - 04 |
| A4 | -1.021405E10 - 04 | -2.014963E10 - 04 | 4.760091E10 - 03 |
| A5 | -5.380769E10 - 05 | -2.761252E10 - 05 | -2.753889E10 - 03 |
| A6 | 1.412860E10 - 05 | 1.003131E10 - 05 | 1.586504E10 - 03 |
| A7 | -2.410200E10 - 07 | 2.182354E10 - 06 | -3.210190E10 - 04 |
| A8 | -3.332937E10 - 07 | -3.752716E10 - 07 | -1.047223E10 - 04 |
| A9 | -1.364107E10 - 08 | -1.536085E10 - 07 | 4.994343E10 - 05 |
| A10 | 6.049844E10 - 09 | -1.052408E10 - 08 | -1.660520E10 - 05 |
| A11 | 2.089683E10 - 10 | 7.701392E10 - 09 | -5.123970E10 - 06 |
| A12 | -3.871584E10 - 10 | -6.207222E10 - 10 | 5.698664E10 - 06 |
| A13 | — | — | 1.052962E10 - 06 |
| A14 | — | — | -7.517815E10 - 07 |
| | 15TH SURFACE | 20TH SURFACE | 21ST SURFACE |
| K | 1.031867E10 + 01 | 3.462556E10 - 01 | 9.933120E10 - 01 |
| A3 | -1.289162E10 - 03 | -7.488000E10 - 04 | -3.224825E10 - 05 |
| A4 | 3.640437E10 - 03 | -1.562709E10 - 03 | 4.263055E10 - 04 |
| A5 | -4.964627E10 - 03 | -5.480381E10 - 05 | 2.098033E10 - 04 |
| A6 | 3.396712E10 - 03 | -6.839477E10 - 04 | -3.149629E10 - 04 |
| A7 | -7.456288E10 - 04 | 3.951107E10 - 04 | 1.211624E10 - 04 |
| A8 | -2.238993E10 - 04 | -8.501115E10 - 06 | 2.123581E10 - 05 |
| A9 | 5.932917E10 - 05 | -5.97107E10 - 05 | -3.943457E10 - 06 |
| A10 | 2.467277E10 - 05 | -1.606850E10 - 06 | -1.001108E10 - 05 |
| A11 | -5.074737E10 - 06 | 7.094050E10 - 06 | -7.323853E10 - 08 |
| A12 | 5.228713E10 - 06 | -7.125528E10 - 07 | 1.117039E10 - 06 |
| A13 | -3.765687E10 - 06 | — | — |
| A14 | 6.303749E10 - 07 | — | — |

FIG. 15A

| EXAMPLE 4 BASIC LENS DATA | | | | | |
|---|---|---|---|---|---|
| | Si (SURFACE NUMBER) | Ri (CURVATURE RADIUS) | Di (SURFACE SEPARATION) | Ndi (REFRACTIVE INDEX) | υdj (ABBE NUMBER) |
| G1f | 1 | -312.7086 | 0.75 | 1.92286 | 20.9 |
|  | 2 | 23.4069 | 0.93 | 1.00000 | |
| G1p | 3 | ∞ | 10.00 | 1.78590 | 44.2 |
|  | 4 | ∞ | 0.05 | 1.00000 | |
| G1r | 5 | ∞ | 1.50 | 1.49700 | 81.6 |
|  | 6 | -18.1424 | 0.10 | 1.00000 | |
|  | *7 | 10.5073 | 2.31 | 1.58809 | 60.4 |
|  | *8 | -53.5896 | D8 (VARIABLE) | 1.00000 | |
| G2 | 9 | 156.2981 | 0.50 | 1.88300 | 40.8 |
|  | 10 | 6.4259 | 0.80 | 1.00000 | |
|  | 11 | -9.9817 | 0.51 | 1.88300 | 40.8 |
|  | 12 | 5.8676 | 1.36 | 1.92286 | 18.9 |
|  | 13 | 288.4257 | D13 (VARIABLE) | 1.00000 | |
| G3 | *14 | 7.7637 | 1.20 | 1.50957 | 56.5 |
|  | *15 | -424.3956 | 0.60 | 1.00000 | |
|  | 16 (APERTURE STOP) | — | D16 (VARIABLE) | 1.00000 | |
| G4 | 17 | 5.1545 | 3.16 | 1.48749 | 70.2 |
|  | 18 | -18.1005 | 0.55 | 1.92286 | 20.9 |
|  | 19 | 29.8899 | 0.39 | 1.00000 | |
|  | *20 | 10.3868 | 2.07 | 1.50957 | 56.5 |
|  | *21 | -75.0689 | D21 (VARIABLE) | 1.00000 | |
| G5 | 22 | -74.8920 | 0.55 | 1.83481 | 42.7 |
|  | 23 | 13.8389 | D23 (VARIABLE) | 1.00000 | |
| GC | 24 | ∞ | 0.85 | 1.51680 | 64.2 |
|  | 25 | ∞ | | | |

(*: ASPHERIC SURFACE) (f = 6.12~28.83mm, FNO. = 4.31~5.62, 2ω = 65.0°~13.8°)

FIG. 15B

| EXAMPLE 4 VARIABLE-SURFACE SEPARATION DATA | | |
|---|---|---|
| SURFACE SEPARATION | WIDE END (f = 6.12) | TELEPHOTO END (f = 28.83) |
| D8 | 0.35 | 6.93 |
| D13 | 7.53 | 0.95 |
| D16 | 5.54 | 1.41 |
| D21 | 1.30 | 1.28 |
| D23 | 7.34 | 11.50 |

FIG. 16

| EXAMPLE 4 ASPHERIC DATA | | | |
|---|---|---|---|
| ASPHERIC COEFFICIENT | SURFACE NUMBER | | |
| | 7TH SURFACE | 8TH SURFACE | 14TH SURFACE |
| K | 2.876871E10 - 01 | -9.36451E10 + 01 | -9.742950E10 - 01 |
| A3 | 2.254516E10 - 04 | 2.494175E10 - 04 | -1.156155E10 - 04 |
| A4 | -3.647122E10 - 05 | 3.218037E10 - 05 | -8.879614E10 - 04 |
| A5 | 7.755459E10 - 06 | -7.273735E10 - 05 | 2.334138E10 - 03 |
| A6 | -6.463840E10 - 06 | 1.030872E10 - 05 | -1.914367E10 - 03 |
| A7 | 6.384656E10 - 07 | 3.504230E10 - 06 | -1.060878E10 - 04 |
| A8 | 4.279235E10 - 07 | 9.799029E10 - 08 | 5.472371E10 - 04 |
| A9 | 5.860139E10 - 08 | -1.344917E10 - 07 | 7.990914E10 - 05 |
| A10 | -8.836474E10 - 09 | -3.437098E10 - 08 | -1.079625E10 - 04 |
| A11 | -7.555830E10 - 09 | -4.485811E10 - 09 | -5.315093E10 - 05 |
| A12 | -1.141373E10 - 09 | 2.497036E10 - 10 | 1.442134E10 - 05 |
| A13 | 3.556306E10 - 11 | 4.199967E10 - 10 | 1.492920E10 - 05 |
| A14 | 7.211415E10 - 11 | 1.044299E10 - 10 | -4.310598E10 - 06 |
| A15 | 1.825731E10 - 11 | 1.190423E10 - 11 | — |
| A16 | 2.331270E10 - 12 | -1.071019E10 - 12 | — |
| A17 | -4.245098E10 - 13 | -1.542056E10 - 12 | — |
| A18 | -2.491969E10 - 13 | -6.109935E10 - 14 | — |
| A19 | -5.241993E10 - 14 | -9.652614E10 - 14 | — |
| A20 | 1.460695E10 - 14 | 2.638700E10 - 14 | — |
| | 15TH SURFACE | 20TH SURFACE | 21ST SURFACE |
| K | -1.013030E10 + 02 | 1.000004E10 + 01 | 1.000113E10 + 01 |
| A3 | -1.614858E10 - 03 | -1.404392E10 - 03 | -1.248150E10 - 03 |
| A4 | 5.154529E10 - 03 | 7.596309E10 - 04 | 4.220891E10 - 03 |
| A5 | -8.289466E10 - 03 | -4.366938E10 - 04 | 5.986390E10 - 04 |
| A6 | 5.444057E10 - 03 | -9.212337E10 - 04 | -1.513854E10 - 03 |
| A7 | -3.751072E10 - 04 | 6.141634E10 - 04 | 7.428469E10 - 04 |
| A8 | -9.360523E10 - 04 | 4.896133E10 - 05 | 1.236719E10 - 04 |
| A9 | -5.862624E10 - 05 | -1.086747E10 - 04 | -1.186332E10 - 04 |
| A10 | 1.785179E10 - 04 | -5.265804E10 - 06 | -1.326956E10 - 05 |
| A11 | 6.927939E10 - 05 | 1.618640E10 - 05 | 1.638091E10 - 05 |
| A12 | -2.087942E10 - 05 | -2.784836E10 - 06 | -2.157492E10 - 06 |
| A13 | -2.662894E10 - 05 | — | — |
| A14 | 8.318391E10 - 06 | — | — |

FIG. 17A

| EXAMPLE 5 BASIC LENS DATA | | | | | |
|---|---|---|---|---|---|
| | Si (SURFACE NUMBER) | Ri (CURVATURE RADIUS) | Di (SURFACE SEPARATION) | Ndi (REFRACTIVE INDEX) | υdj (ABBE NUMBER) |
| G1f | 1 | 100.2420 | 0.79 | 1.92286 | 20.9 |
| G1f | 2 | 19.5110 | 1.15 | 1.00000 | |
| G1p | 3 | ∞ | 10.10 | 1.78590 | 44.2 |
| G1p | 4 | ∞ | 0.05 | 1.00000 | |
| G1r | 5 | ∞ | 1.50 | 1.49700 | 81.6 |
| G1r | 6 | -20.6141 | 0.10 | 1.00000 | |
| G1r | *7 | 11.4051 | 2.25 | 1.58809 | 60.4 |
| G1r | *8 | -58.3949 | D8 (VARIABLE) | 1.00000 | |
| G2 | 9 | 479.6730 | 0.52 | 1.88300 | 40.8 |
| G2 | 10 | 6.8534 | 0.90 | 1.00000 | |
| G2 | 11 | -9.3175 | 0.53 | 1.88300 | 40.8 |
| G2 | 12 | 7.3866 | 1.36 | 1.92286 | 18.9 |
| G2 | 13 | -63.6194 | D13 (VARIABLE) | 1.00000 | |
| G3 | *14 | 7.4017 | 1.20 | 1.50957 | 56.5 |
| G3 | *15 | 100.0000 | 0.60 | 1.00000 | |
| | 16 (APERTURE STOP) | — | D16 (VARIABLE) | 1.00000 | |
| G4 | 17 | 5.2080 | 3.26 | 1.48749 | 70.2 |
| G4 | 18 | -18.0164 | 0.55 | 1.92286 | 20.9 |
| G4 | 19 | 30.4689 | 0.18 | 1.00000 | |
| G4 | *20 | 11.0031 | 1.93 | 1.50957 | 56.5 |
| G4 | *21 | -77.1768 | D21 (VARIABLE) | 1.00000 | |
| G5 | 22 | -33.1586 | 0.55 | 1.83481 | 42.7 |
| G5 | 23 | 17.8906 | D23 (VARIABLE) | 1.00000 | |
| GC | 24 | ∞ | 0.85 | 1.51680 | 64.2 |
| GC | 25 | ∞ | | | |

(*: ASPHERIC SURFACE) (f = 6.13~28.89mm, FNO. = 3.71~4.67, 2ω = 65.0°~13.8°)

FIG. 17B

| EXAMPLE 5 VARIABLE-SURFACE SEPARATION DATA | | |
|---|---|---|
| SURFACE SEPARATION | WIDE END (f = 6.13) | TELEPHOTO END (f = 28.89) |
| D8 | 0.25 | 7.81 |
| D13 | 8.50 | 0.94 |
| D16 | 4.97 | 1.38 |
| D21 | 1.15 | 1.79 |
| D23 | 7.76 | 10.72 |

FIG. 18

| EXAMPLE 5 ASPHERIC DATA | | | |
|---|---|---|---|
| ASPHERIC COEFFICIENT | SURFACE NUMBER | | |
| | 7TH SURFACE | 8TH SURFACE | 14TH SURFACE |
| K | 2.620700E10 - 03 | -9.149153E10 + 00 | 4.408938E10 - 01 |
| A3 | 5.295089E10 - 04 | 7.526540E10 - 04 | -1.547374E10 - 04 |
| A4 | -1.486648E10 - 05 | -3.676928E10 - 04 | 6.862454E10 - 05 |
| A5 | -1.329309E10 - 05 | 1.941171E10 - 05 | 3.330727E10 - 05 |
| A6 | 6.390834E10 - 06 | 8.208665E10 - 06 | -3.741018E10 - 04 |
| A7 | 1.233927E10 - 06 | 1.216778E10 - 06 | 1.296451E10 - 04 |
| A8 | 1.050795E10 - 08 | -7.349401E10 - 08 | 8.366231E10 - 05 |
| A9 | -4.746396E10 - 08 | -8.985617E10 - 08 | -1.379019E10 - 05 |
| A10 | -1.436771E10 - 08 | -1.303318E10 - 08 | -1.831617E10 - 05 |
| A11 | -2.089684E10 - 09 | -4.095896E10 - 09 | -3.410470E10 - 06 |
| A12 | 2.309574E10 - 11 | -6.001652E10 - 11 | 2.310797E10 - 06 |
| A13 | 1.071761E10 - 10 | 2.020526E10 - 10 | 1.302734E10 - 06 |
| A14 | 3.539300E10 - 11 | 7.737818E10 - 11 | -4.156248E10 - 07 |
| A15 | 6.369977E10 - 12 | 1.566071E10 - 11 | — |
| A16 | 2.626462E10 - 13 | 1.163525E10 - 12 | — |
| A17 | -2.756825E10 - 13 | -6.549612E10 - 13 | — |
| A18 | -1.060960E10 - 13 | -3.547533E10 - 13 | — |
| A19 | -2.046745E10 - 14 | -6.291024E10 - 14 | — |
| A20 | 6.606639E10 - 15 | 2.229170E10 - 14 | — |
| | 15TH SURFACE | 20TH SURFACE | 21ST SURFACE |
| K | -2.690000E10 - 05 | -2.697914E10 + 00 | -1.788862E10 + 01 |
| A3 | -3.940089E10 - 04 | 6.999969E10 - 04 | -1.851220E10 - 04 |
| A4 | 1.598007E10 - 03 | -7.904877E10 - 04 | 4.654577E10 - 03 |
| A5 | -2.425229E10 - 03 | 1.558677E10 - 03 | -1.780236E10 - 03 |
| A6 | 1.339650E10 - 03 | -8.236179E10 - 04 | 1.072373E10 - 03 |
| A7 | -3.025219E10 - 05 | 2.163556E10 - 04 | 1.163219E10 - 05 |
| A8 | -1.547856E10 - 04 | 2.924717E10 - 05 | -1.153229E10 - 04 |
| A9 | -2.063097E10 - 05 | -2.547298E10 - 05 | -1.756714E10 - 06 |
| A10 | 1.711021E10 - 05 | -2.496168E10 - 06 | 1.162349E10 - 05 |
| A11 | 7.260568E10 - 06 | 3.708213E10 - 06 | 1.115062E10 - 06 |
| A12 | -8.901905E10 - 07 | -5.885242E10 - 07 | -7.178374E10 - 07 |
| A13 | -1.555726E10 - 06 | — | — |
| A14 | 3.455022E10 - 07 | — | — |

FIG. 19A

| | EXAMPLE 6 BASIC LENS DATA | | | | |
|---|---|---|---|---|---|
| | Si (SURFACE NUMBER) | Ri (CURVATURE RADIUS) | Di (SURFACE SEPARATION) | Ndi (REFRACTIVE INDEX) | υdj (ABBE NUMBER) |
| G1f | 1 | 188.6485 | 0.79 | 1.92286 | 20.9 |
| G1f | 2 | 19.6551 | 1.15 | 1.00000 | |
| G1p | 3 | ∞ | 10.10 | 1.78590 | 44.2 |
| G1p | 4 | ∞ | 0.05 | 1.00000 | |
| G1r | 5 | ∞ | 1.50 | 1.49700 | 81.6 |
| G1r | 6 | -20.7203 | 0.10 | 1.00000 | |
| G1r | *7 | 11.3556 | 2.35 | 1.58809 | 60.4 |
| G1r | *8 | -39.6983 | D8 (VARIABLE) | 1.00000 | |
| G2 | 9 | -57.0086 | 0.52 | 1.88300 | 40.8 |
| G2 | 10 | 7.1115 | 0.90 | 1.00000 | |
| G2 | 11 | -13.8393 | 0.53 | 1.88300 | 40.8 |
| G2 | 12 | 7.2780 | 1.36 | 2.14352 | 17.8 |
| G2 | 13 | 36.5868 | D13 (VARIABLE) | 1.00000 | |
| G3 | *14 | 7.2825 | 1.20 | 1.50957 | 56.5 |
| G3 | *15 | 100.0000 | 0.60 | 1.00000 | |
| | 16 (APERTURE STOP) | — | D16 (VARIABLE) | 1.00000 | |
| G4 | 17 | 5.2083 | 3.36 | 1.48749 | 70.2 |
| G4 | 18 | -18.0200 | 0.55 | 1.92286 | 20.9 |
| G4 | 19 | 28.1445 | 0.16 | 1.00000 | |
| G4 | *20 | 11.1094 | 1.98 | 1.50957 | 56.5 |
| G4 | *21 | -43.7461 | D21 (VARIABLE) | 1.00000 | |
| G5 | 22 | -27.7932 | 0.55 | 1.83300 | 40.8 |
| G5 | 23 | 22.5083 | D23 (VARIABLE) | 1.00000 | |
| GC | 24 | ∞ | 0.85 | 1.51680 | 64.2 |
| GC | 25 | ∞ | | | |

(*: ASPHERIC SURFACE) (f = 6.12~28.82mm, FNO. = 3.63~4.58, 2ω = 65.2°~13.8°)

FIG. 19B

| EXAMPLE 6 VARIABLE-SURFACE SEPARATION DATA | | |
|---|---|---|
| SURFACE SEPARATION | WIDE END (f = 6.12) | TELEPHOTO END (f = 28.82) |
| D8 | 0.34 | 7.55 |
| D13 | 8.10 | 0.90 |
| D16 | 5.11 | 1.42 |
| D21 | 1.30 | 1.24 |
| D23 | 7.40 | 11.15 |

FIG. 20

| ASPHERIC COEFFICIENT | EXAMPLE 6 ASPHERIC DATA | | |
|---|---|---|---|
| | SURFACE NUMBER | | |
| | 7TH SURFACE | 8TH SURFACE | 14TH SURFACE |
| K | -4.970210E10 - 02 | -9.688852E10 + 00 | 5.538480E10 - 01 |
| A3 | 5.687096E10 - 04 | 7.779223E10 - 04 | -2.795810E10 - 04 |
| A4 | -1.554510E10 - 04 | -3.547201E10 - 04 | 1.089103E10 - 04 |
| A5 | -9.780438E10 - 06 | 1.867643E10 - 05 | 4.466471E10 - 05 |
| A6 | 6.494112E10 - 06 | 8.245391E10 - 06 | -3.970832E10 - 04 |
| A7 | 1.207181E10 - 06 | 1.270875E10 - 06 | 1.209173E10 - 04 |
| A8 | 1.657867E10 - 09 | -6.426605E10 - 08 | 8.496402E10 - 05 |
| A9 | -4.907573E10 - 08 | -9.036455E10 - 08 | -1.201697E10 - 05 |
| A10 | -1.450505E10 - 08 | -1.375461E10 - 08 | -1.777264E10 - 05 |
| A11 | -2.062394E10 - 09 | -4.325534E10 - 09 | -3.406951E10 - 06 |
| A12 | 3.986810E10 - 11 | -1.034597E10 - 10 | 2.207490E10 - 06 |
| A13 | 1.117946E10 - 10 | 1.996420E10 - 10 | 1.261359E10 - 06 |
| A14 | 3.619680E10 - 12 | 7.923431E10 - 11 | -4.015648E10 - 07 |
| A15 | 6.396990E10 - 12 | 1.658072E10 - 11 | — |
| A16 | 2.201653E10 - 13 | 1.396722E10 - 12 | — |
| A17 | -2.940760E10 - 13 | -6.286673E10 - 13 | — |
| A18 | -1.105418E10 - 13 | -3.663750E10 - 13 | — |
| A19 | -2.077544E10 - 14 | -7.256914E10 - 14 | — |
| A20 | 6.949882E10 - 15 | 2.398281E10 - 14 | — |
| | 15TH SURFACE | 20TH SURFACE | 21ST SURFACE |
| K | 1.000571E10 + 01 | -2.953920E10 + 00 | -1.000039E10 + 01 |
| A3 | -5.911938E10 - 04 | 5.311140E10 - 04 | -3.464296E10 - 04 |
| A4 | 1.923245E10 - 03 | -7.400424E10 - 04 | 4.649681E10 - 03 |
| A5 | -2.625882E10 - 03 | 1.535814E10 - 03 | -1.853552E10 - 03 |
| A6 | 1.369740E10 - 03 | -8.286920E10 - 04 | 1.093437E10 - 03 |
| A7 | -1.615689E10 - 05 | 2.207129E10 - 04 | 1.747316E10 - 05 |
| A8 | -1.562730E10 - 04 | 2.942290E10 - 05 | -1.166315E10 - 04 |
| A9 | -2.253927E10 - 05 | -2.588244E10 - 05 | -2.639848E10 - 06 |
| A10 | 1.667256E10 - 05 | -2.572645E10 - 06 | 1.142507E10 - 05 |
| A11 | 7.447300E10 - 06 | 3.752696E10 - 06 | 1.126183E10 - 06 |
| A12 | -7.627795E10 - 07 | -5.880258E10 - 07 | -6.731367E10 - 07 |
| A13 | -1.534495E10 - 06 | — | — |
| A14 | 3.245191E10 - 07 | — | — |

FIG. 21A

| | | EXAMPLE 7 BASIC LENS DATA | | | |
|---|---|---|---|---|---|
| | Si (SURFACE NUMBER) | Ri (CURVATURE RADIUS) | Di (SURFACE SEPARATION) | Ndi (REFRACTIVE INDEX) | νdj (ABBE NUMBER) |
| G1f | 1 | −962.8696 | 0.80 | 1.92286 | 20.9 |
| | 2 | 20.6128 | 1.13 | 1.00000 | |
| G1p | 3 | ∞ | 10.25 | 1.78590 | 44.2 |
| | 4 | ∞ | 0.04 | 1.00000 | |
| G1r | 5 | ∞ | 1.50 | 1.49700 | 81.6 |
| | 6 | −18.8524 | 0.10 | 1.00000 | |
| | *7 | 10.8842 | 2.20 | 1.50957 | 56.5 |
| | *8 | −28.0878 | D8 (VARIABLE) | 1.00000 | |
| G2 | *9 | −8.6199 | 0.70 | 1.50957 | 56.5 |
| | *10 | 26.8202 | 0.75 | 1.00000 | |
| | 11 | −14.1463 | 0.52 | 1.88300 | 40.8 |
| | 12 | 5.1395 | 1.38 | 1.92286 | 18.9 |
| | 13 | 16.1652 | D13 (VARIABLE) | 1.00000 | |
| G3 | *14 | 7.2227 | 1.20 | 1.50957 | 56.5 |
| | *15 | 219.0197 | 0.10 | 1.00000 | |
| | 16 (APERTURE STOP) | — | D16 (VARIABLE) | 1.00000 | |
| G4 | 17 | 5.2091 | 3.49 | 1.48749 | 70.2 |
| | 18 | −18.1193 | 0.55 | 1.92286 | 20.9 |
| | 19 | 21.8413 | 0.45 | 1.00000 | |
| | *20 | 49.2619 | 1.72 | 1.50957 | 56.5 |
| | *21 | −9.7836 | D21 (VARIABLE) | 1.00000 | |
| G5 | 22 | −22.5000 | 0.75 | 1.50957 | 56.5 |
| | 23 | 14.3985 | D23 (VARIABLE) | 1.00000 | |
| GC | 24 | ∞ | 0.85 | 1.51680 | 64.2 |
| | 25 | ∞ | | | |

(*: ASPHERIC SURFACE) (f = 6.09~28.70mm, FNO. = 4.00~5.41, 2ω = 65.2°~14.0°)

FIG. 21B

| EXAMPLE 7 VARIABLE-SURFACE SEPARATION DATA | | |
|---|---|---|
| SURFACE SEPARATION | WIDE END (f = 6.09) | TELEPHOTO END (f = 28.70) |
| D8 | 0.39 | 7.28 |
| D13 | 7.79 | 0.89 |
| D16 | 6.33 | 1.14 |
| D21 | 1.88 | 1.22 |
| D23 | 6.39 | 12.25 |

FIG. 22

| EXAMPLE 7 ASPHERIC DATA ||||| 
|---|---|---|---|---|
| ASPHERIC COEFFICIENT | SURFACE NUMBER ||||
| | 7TH SURFACE | 8TH SURFACE | 9TH SURFACE | 10TH SURFACE |
| K | 2.471010E10 - 02 | -2.951368E10 + 00 | -2.328832E10 + 01 | 2.991232E10 + 01 |
| A3 | 1.935131E10 - 05 | -3.691242E10 - 05 | — | — |
| A4 | -6.193511E10 - 05 | 6.261303E10 - 05 | 2.087463E10 - 03 | 5.957527E10 - 03 |
| A5 | 8.512274E10 - 05 | -1.138821E10 - 05 | — | — |
| A6 | -2.135127E10 - 05 | 2.297804E10 - 06 | -2.274767E10 - 04 | -6.722114E10 - 04 |
| A7 | -1.246036E10 - 06 | -9.438830E10 - 08 | — | — |
| A8 | 5.882474E10 - 07 | -2.701510E10 - 07 | 1.490778E10 - 05 | 5.062486E10 - 05 |
| A9 | 1.449374E10 - 07 | 3.145694E10 - 09 | — | — |
| A10 | -1.638842E10 - 09 | 2.307764E10 - 08 | -4.042147E10 - 07 | -1.574214E10 - 06 |
| A11 | -5.848661E10 - 09 | -3.867335E10 - 10 | — | — |
| A12 | -1.650221E10 - 09 | -5.340815E10 - 10 | — | — |
| A13 | -1.569483E10 - 10 | -1.694365E10 - 10 | — | — |
| A14 | 4.995634E10 - 11 | -4.048109E10 - 12 | — | — |
| A15 | 2.105898E10 - 11 | -4.440153E10 - 12 | — | — |
| A16 | 3.240929E10 - 12 | 4.010607E10 - 12 | — | — |
| A17 | -8.309654E10 - 14 | 4.649463E10 - 13 | — | — |
| A18 | -2.501674E10 - 13 | -1.297192E10 - 13 | — | — |
| A19 | -6.702176E10 - 14 | -5.443563E10 - 14 | — | — |
| A20 | 1.500425E10 - 14 | 9.596745E10 - 15 | — | — |
| | 14TH SURFACE | 15TH SURFACE | 20TH SURFACE | 21ST SURFACE |
| K | -1.810833E10 + 00 | 2.999983E10 + 01 | -2.782702E10 + 01 | 9.701830E10 + 00 |
| A3 | -4.328636E10 - 04 | -2.522603E10 - 03 | 4.841444E10 - 04 | -1.160412E10 - 04 |
| A4 | -1.346730E10 - 04 | 9.041755E10 - 03 | -2.683778E10 - 03 | 3.406924E10 - 03 |
| A5 | 2.975349E10 - 03 | -1.315104E10 - 02 | 2.084638E10 - 03 | -1.922539E10 - 03 |
| A6 | -2.307791E10 - 03 | 8.302823E10 - 03 | -1.788484E10 - 03 | 1.528318E10 - 03 |
| A7 | -6.637220E10 - 05 | -4.925562E10 - 04 | 7.605554E10 - 04 | -3.025891E10 - 04 |
| A8 | 5.622520E10 - 04 | -1.275949E10 - 03 | -4.898742E10 - 06 | -1.182492E10 - 04 |
| A9 | 3.313010E10 - 05 | -1.109458E10 - 04 | -7.654223E10 - 05 | 6.632625E10 - 05 |
| A10 | -8.723596E10 - 05 | 2.189979E10 - 04 | 4.549309E10 - 06 | 1.512775E10 - 05 |
| A11 | -3.100191E10 - 05 | 8.833782E10 - 05 | 7.512279E10 - 06 | -1.372932E10 - 05 |
| A12 | 7.999264E10 - 06 | -2.068057E10 - 07 | -1.397034E10 - 06 | 2.309528E10 - 06 |
| A13 | 9.824209E10 - 06 | -2.963065E10 - 05 | — | — |
| A14 | -2.709340E10 - 06 | 8.353455E10 - 06 | — | — |

FIG. 23

| VALUES REGARDING CONDITIONAL EXPRESSIONS | | | |
|---|---|---|---|
| | fw / f1 | f1f / f1r | \| f2 / fw \| |
| EXAMPLE 1 | 0.47 | -2.19 | 0.76 |
| EXAMPLE 2 | 0.62 | -2.90 | 0.58 |
| EXAMPLE 3 | 0.54 | -2.42 | 0.69 |
| EXAMPLE 4 | 0.50 | -2.19 | 0.73 |
| EXAMPLE 5 | 0.44 | -2.23 | 0.79 |
| EXAMPLE 6 | 0.47 | -2.12 | 0.78 |
| EXAMPLE 7 | 0.47 | -1.95 | 0.79 |

EXAMPLE 1 (WIDE END)

EXAMPLE 1 (TELEPHOTO END)

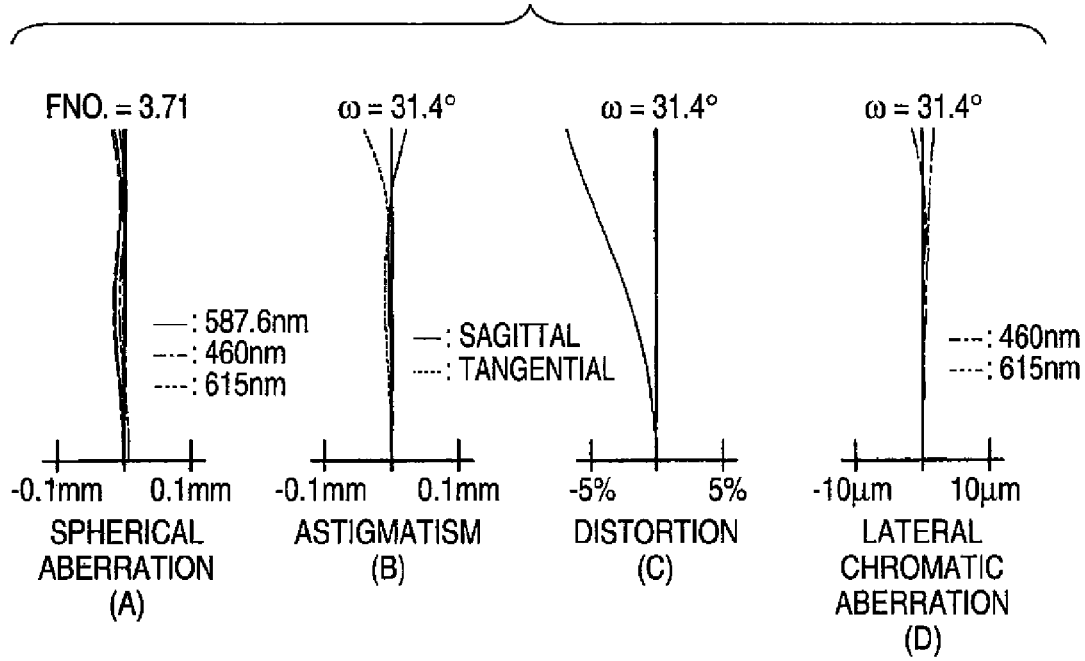
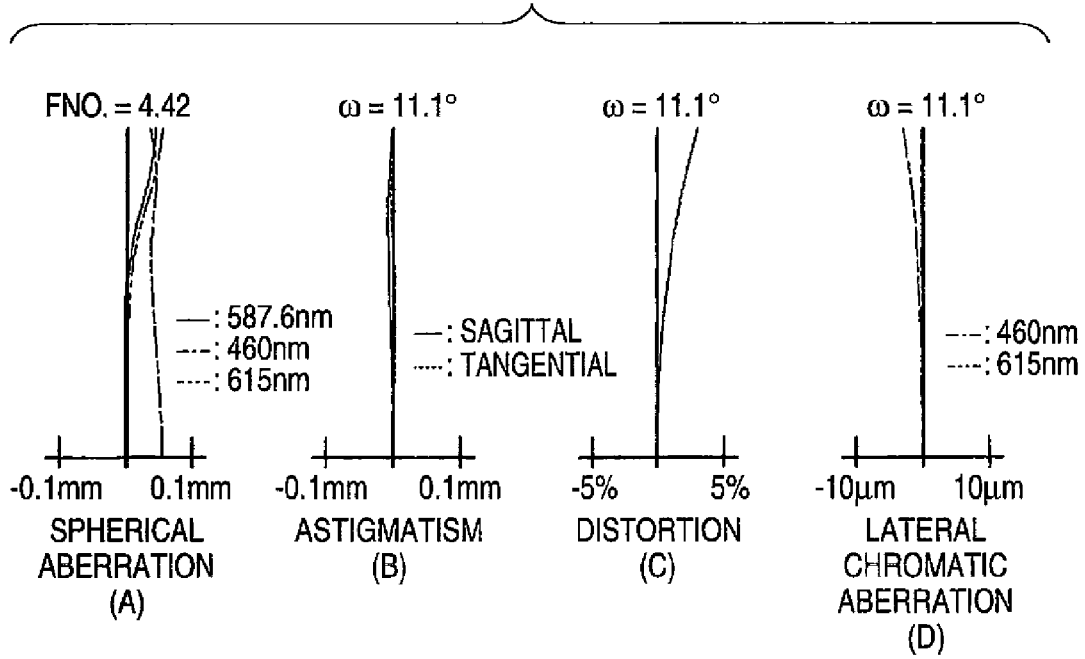

EXAMPLE 3 (WIDE END)

EXAMPLE 3 (TELEPHOTO END)

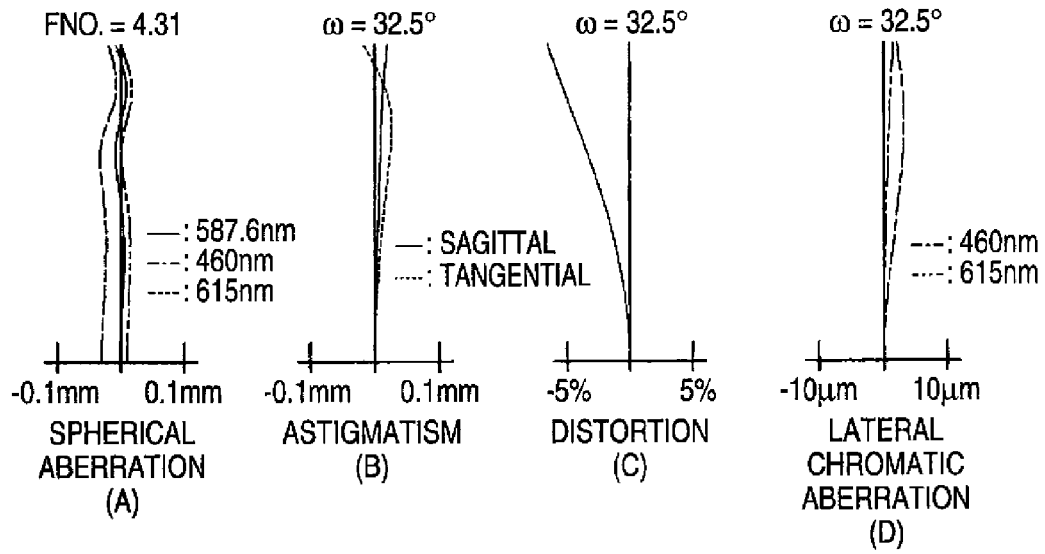
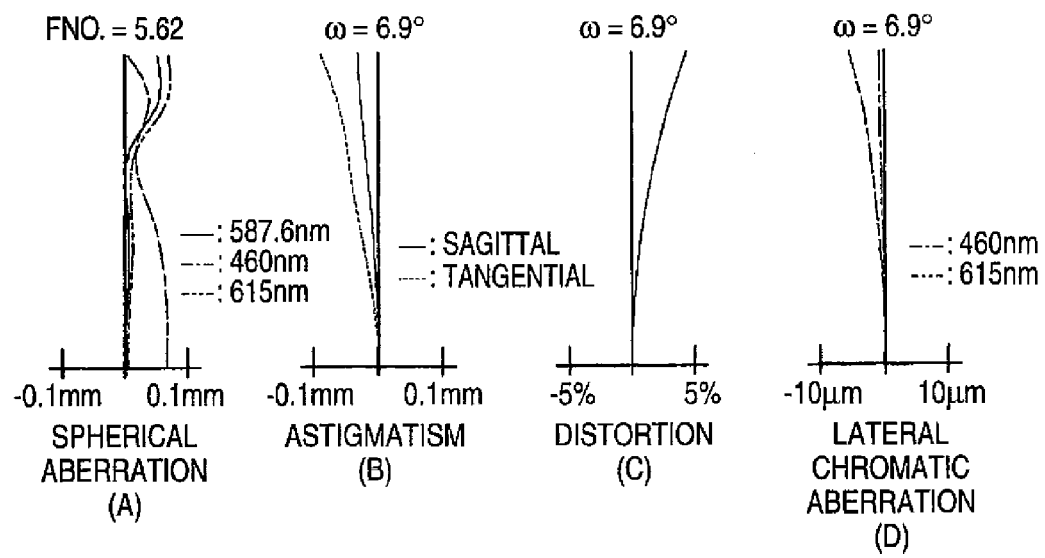

EXAMPLE 5 (WIDE END)

EXAMPLE 5 (TELEPHOTO END)

EXAMPLE 6 (WIDE END)

EXAMPLE 6 (TELEPHOTO END)

EXAMPLE 7 (WIDE END)

EXAMPLE 7 (TELEPHOTO END)

VARIABLE-POWER OPTICAL SYSTEM AND IMAGING DEVICE

CROSS-REFERENCE TO RELATED APPLICATIONS

This application is based upon and claims the benefit of priority from the Japanese Patent Application Nos. 2007-84086 (filed on Mar. 28, 2007) and 2007-174314 (filed on Jul. 2, 2007); the entire contents of which are incorporated herein by reference.

BACKGROUND OF THE INVENTION

1. Technical Field

The invention relates to a variable-power optical system and an imaging device that are suitably used for a small-sized device having an imaging function, such as a digital still camera, a mobile phone having a camera built therein and a personal digital assistance (PDA).

2. Description of the Related Art

In imaging devices such as a digital still camera, decrease in size of the entire device has been required along with decrease in size of imaging elements such as CCD (Charge Coupled Device) or CMOS (Complementary Metal Oxide Semiconductor). With the decrease in size, decrease in thickness is required for an imaging lens, particularly, a variable-power optical system (zoom lens) to reduce its total length. Japanese Patent No. 3196283 describes a variable-power optical system that is used for a digital still camera and that has a five-group configuration. The variable-power optical system described in Japanese Patent No. 3196283 is a straight-type optical system in which optical members constituting the lens system are arranged in a straight line without a direction of the optical axis being changed. Here, the size of the imaging device in a thickness direction is determined substantially by a length from the most-object-side optical member to an imaging element. On the other hand, in order to meat the recent requirement for increase in pixels and enhancement in performance of the imaging element, the number of lenses increases. Thus, it becomes difficult to decrease the total length of the lens system. Accordingly, it is difficult to decrease the total thickness of the imaging device. As a result, in order to decrease the thickness of the imaging device, a so-called bending-type optical system in which an optical path of the lens system is bent in the middle way has been developed.

In the bending-type optical system, a reflecting member such as a right-angle prism is disposed in a first lens group to bend the optical path in its middle way by about 90°, thereby decreasing the length of the optical system in the thickness direction. As such a bending-type variable-power optical system, one that has a four-group configuration and that moves a second lens group and a fourth lens group at the time of varying the magnification has been known. With the requirement for a higher variable-magnification ratio, one which employs a bending-type variable-power optical system and which has five groups as a whole has been developed, thereby accomplishing a higher variable-magnification ratio than the four-group configuration (see JP 2006-301543 A (corresponding to US 2006/0238886 A) and JP 2006-98686 A (US 2006/0066955 A)). In the variable-power optical system described in JP 2006-323051 A, a second lens group and a fourth lens group are moved at the time of varying the magnification. In the variable-power optical systems described in JP 2006-301543 A and JP 2006-98686 A, a fifth lens group is also moved at the time of varying the magnification in addition to the second lens group and the fourth lens group. In the variable-power optical system described in JP 2006-301543 A, the fifth lens group has a focusing function and the focusing function is performed from the infinity to a vicinity point by moving the fifth lens group toward an image formation surface. At the time of varying the magnification, a focal length is changed by the linear motions of the second lens group and the fourth lens group. Variation of the image formation surface is corrected by the nonlinear motion of the fifth lens group.

However, in the optical system described in Japanese Patent No. 3196283, the focal length f1 of the first lens group is large and thus, the total length of the lenses is also large. Therefore, such a configuration is disadvantageous in decrease in size. In the optical system described in JP 2006-301543 A, the fifth lens group is moved toward the image formation surface to perform the focusing function. Accordingly, when the fifth lens group is moved at the time of focusing, a distance of an exit pupil is greatly varied and change due to shading easily occurs. Since the fifth lens group gets close to the image formation surface at the time of focusing, dust or scratches attached to the lens surfaces of the fifth lens group can affect the image quality. In the optical system described in JP 2006-323051 A, when it is assumed that the first lens group is divided into a front group and a rear group at a reflecting surface, the focal length f1r of the rear group of the first lens group is set to be greater, thereby increasing the total length of lenses. Accordingly, such a configuration is disadvantageous in decrease in size. In the optical system described in JP 2006-98686 A, since the focal length f2 of the second lens group is great, the total length of the lenses is great. Thus, such a configuration is disadvantageous in decrease in size.

SUMMARY OF THE INVENTION

The invention has been made in view of the above circumstances and provides a variable-power optical system and an imaging device that can keep excellent optical performance and reduce the total length of lenses, thereby accomplishing decrease in size.

According to a first aspect of the invention, a variable-power optical system comprising, in order from an object side, a first lens group, a second lens group, a third lens group, a fourth lens group and a fifth lens group. The first lens group is fixed at a time of varying magnification and at a time of focusing. The first lens group has a positive refractive power. The second lens group is movable at the time of varying the magnification and has a negative refractive power. The third lens group is fixed at the time of varying the magnification and at the time of focusing. The third lens group has a positive refractive power. The fourth lens group is movable at the time of varying the magnification. The fourth lens group has a focusing function and that a positive refractive power. The fifth lens group is movable at the time of varying the magnification and has a negative refractive power. The following conditional expressions are satisfied:

$$0.4 < fw/f1 < 0.8 \tag{1}$$

$$0.5 < |f2/fw| < 0.8 \tag{2}$$

where fw denotes a focal length of the whole system at a wide end, f1 denotes a focal length of the first lens group, and f2 denotes a focal length of the second lens group.

The variable-power optical system according to the first aspect of the invention has the five-group configuration and the second lens group, the fourth lens group, and the fifth lens group are moved at the time of varying the magnification. Therefore, this configuration is advantageous in increase of a variable-magnification ratio. Since the focal lengths of the first lens group and the second lens group satisfy the proper conditions, it is possible to reduce the total length of lenses while excellent optical performance is kept, thereby easily reducing the size thereof. Since the fourth lens group has the focusing function, variation in exit pupil distance at the time of focusing becomes smaller and variation in shading becomes smaller than those in the case where the fifth lens group has the focusing function. The dust or scratches attached to the lens surfaces of the fifth lens group, which is closest to the image formation surface at the time of focusing, hardly affects the image quality.

In the variable-power optical system according to the first aspect of the invention, the first lens group may include, in order from the object side, a front group having a negative refractive power, a reflecting member that bends an optical path, and a rear group having a positive refractive power. The following conditional expression may be satisfied:

$$-3.5 < f1f/f1r < -1.8 \qquad (3)$$

where $f1f$ denotes a focal length of the front group of the first lens group, and $f1r$ denotes a focal length of the rear group of the first lens group.

In this configuration, the variable-power optical system is configured as a bending-type optical system in which an optical path is bent by the reflecting member disposed in the first lens group. Therefore, it is possible to suppress the length of the optical system in the thickness direction while the excellent optical performance is kept, thereby easily reducing the thickness when the optical system is built in an imaging device. When such a bending-type optical system is built in an imaging device, the thickness of the imaging device greatly depends on the size of the first lens group which serves to bend the optical path, rather than the total length of the lenses. Accordingly, since the optical system satisfies Conditional Expression (3), it is possible to reduce the total length and to easily reduce the size of the first lens group including the reflecting member.

According to a second aspect of the invention, a variable-power optical system includes, in order from an object side, a first lens group, a second lens group, a third lens group, a fourth lens group and a fifth lens group. The first lens group is fixed at a time of varying magnification and at a time of focusing. The first lens group has a positive refractive power. The second lens group is movable at the time of varying the magnification and has a negative refractive power. The third lens group is fixed at the time of varying the magnification and at the time of focusing. The third lens group has a positive refractive power. The fourth lens group is movable at the time of varying the magnification. The fourth lens group has a focusing function and has a positive refractive power. The fifth lens group is movable at the time of varying the magnification and has a negative refractive power. The first lens group includes, in order from the object side, a front group having a negative refractive power, a reflecting member that bends an optical path, and a rear group having a positive refractive power. The following conditional expression is satisfied:

$$-3.5 < f1f/f1r < -1.8 \qquad (3)$$

where $f1f$ denotes a focal length of the front group of the first lens group, and $f1r$ denotes a focal length of the rear group of the first lens group.

The variable-power optical system according to the second aspect of the invention has the five-group configuration, and the second lens group, the fourth lens group, and the fifth lens group are moved at the time of varying the magnification. Therefore, this configuration is advantageous in increase of a variable-magnification ratio. Since the variable-power optical system is configured as a bending-type optical system in which an optical path is bent by the reflecting member disposed in the first lens group, it is possible to suppress the length of the optical system in the thickness direction while the excellent optical performance is kept, thereby easily reducing the thickness when it is fitted to an imaging device. When such a bending-type optical system is built in an imaging device, the thickness of the imaging device greatly depends on the size of the first lens group which serves to bend the optical path, rather than the total length of lenses. Accordingly, since the optical system satisfies Conditional Expression (3), it is possible to reduce the total length and to easily reduce the size of the first lens group including the reflecting member. Also, since the fourth lens group has the focusing function, variation in exit pupil distance at the time of focusing becomes smaller and variation in shading becomes smaller than those in the case where the fifth lens group G5 has the focusing function. The dust or scratches attached to the lens surfaces of the fifth lens group, which is closest to the image formation surface at the time of focusing, hardly affects the image quality.

In the variable-power optical system of the first or second aspect of the invention, the second lens group and the fifth lens group may move on an optical axis so as to have difference movement directions from each other and to perform a linear straight-line motion. Also the fourth lens group may move to perform a nonlinear motion.

With this configuration, the second lens group and the fifth lens group can be moved by a single motor. Accordingly, it is possible to reduce the number of motors which are required for respective moving lens groups and to simplify the movement control, thereby accomplishing decrease in size and cost of the imaging device including the mechanisms.

In the variable-power optical system of the first or second aspect of the invention, each of the first lens group to the fifth lens group may include at least one plastic lens.

This configuration is advantageous in decrease of weight and cost of the optical system.

In the variable-power optical system of the first or second aspect of the invention, the rear group of the first lens group may include at least one positive lens. The second lens group may include at least one negative lens. A plastic lens is used as the at least one positive lens of the rear group of the first lens group. A plastic lens is preferably used as the at least one negative lens of the second lens group. With this configuration, it is possible to reduce the movement of the focal point at a time of temperature variation due to the use of the plastic lens.

According to a third aspect of the invention, an imaging device includes the variable-power optical system of the first or second aspect of the invention and an imaging element. The imaging element outputs an imaging signal corresponding to an optical image formed by the variable-power optical system.

In the imaging device, it is possible to obtain the imaging signals with high resolution on the basis of an optical image with high resolution acquired by the variable-power optical system.

In the variable-power optical system according to the first aspect of the invention, the optical system has the five-group configuration as a whole. The second lens group, the fourth lens group, and the fifth lens group are moved at the time of varying the magnification. The focal lengths of the first lens group and the second lens group satisfy the proper condition. Accordingly, it is possible to reduce the total length of lenses while the excellent optical performance is kept, thereby accomplishing the decrease in size.

In the variable-power optical system according to the second aspect of the invention, the optical system has the five-group configuration as a whole. The second lens group, the fourth lens group, and the fifth lens group are moved at the time of varying the magnification. The optical system is a bending-type optical system in which the optical path is bent by the reflecting member disposed in the first lens group. The focal lengths of the front group and the rear group of the first lens group satisfy the proper condition. Accordingly, it is possible to reduce the total length of lenses while the excellent optical performance is kept, thereby accomplishing the decrease in size.

In the imaging device according to the third aspect of the invention, the imaging signals are output so as to correspond to the optical image formed by the high-performance variable-power optical system. Thereby, it is possible to obtain the imaging signals with high resolution.

BRIEF DESCRIPTION OF THE DRAWINGS

FIG. 1 illustrates a first configuration example of a variable-power optical system according to an embodiment of the invention and is a section view of lenses corresponding to Example 1.

FIG. 3 illustrates a third configuration example of the variable-power optical system according to the embodiment of the invention and is a section view of lenses corresponding to Example 3.

FIG. 4 illustrates a fourth configuration example of the variable-power optical system according to the embodiment of the invention and is a section view of lenses corresponding to Example 4.

FIG. 5 illustrates a fifth configuration example of the variable-power optical system according to the embodiment of the invention and is a section view of lenses corresponding to Example 5.

FIG. 6 illustrates a sixth configuration example of the variable-power optical system according to the embodiment of the invention and is a section view of lenses corresponding to Example 6.

FIG. 9 is a diagram illustrating lens data of the variable-power optical system according to Example 1, where FIG. 9A shows basic lens data and FIG. 9B shows surface separation data of a portion that varies along with variation in magnification.

FIG. 10 is a diagram illustrating data on an aspherical surface of the variable-power optical system according to Example 1.

FIG. 11 is a diagram illustrating lens data of a variable-modification optical system according to Example 2, where FIG. 11A shows basic lens data and FIG. 11B shows surface separation data of a portion that varies along with variation in magnification.

FIG. 12 is a diagram illustrating data on an aspherical surface of the variable-power optical system according to Example 2.

FIG. 13 is a diagram illustrating lens data of a variable-modification optical system according to Example 3, where FIG. 13A shows basic lens data and FIG. 13B shows surface separation data of a portion that varies along with variation in magnification.

FIG. 14 is a diagram illustrating data on an aspherical surface of the variable-power optical system according to Example 3.

FIG. 15 is a diagram illustrating lens data of a variable-modification optical system according to Example 4, where FIG. 15A shows basic lens data and FIG. 15B shows surface separation data of a portion that varies along with variation in magnification.

FIG. 16 is a diagram illustrating data on an aspherical surface of the variable-power optical system according to Example 4.

FIG. 17 is a diagram illustrating lens data of a variable-modification optical system according to Example 5, where FIG. 17A shows basic lens data and FIG. 17B shows surface separation data of a portion that varies along with variation in magnification.

FIG. 18 is a diagram illustrating data on an aspherical surface of the variable-power optical system according to Example 5.

FIG. 19 is a diagram illustrating lens data of a variable-modification optical system according to Example 6, where FIG. 19A shows basic lens data and FIG. 19B shows surface separation data of a portion that varies along with variation in magnification.

FIG. 20 is a diagram illustrating data on an aspherical surface of the variable-power optical system according to Example 6.

FIG. 21 is a diagram illustrating lens data of a variable-modification optical system according to Example 7, where FIG. 21A shows basic lens data and FIG. 21B shows surface separation data of a portion that varies along with variation in magnification.

FIG. 22 is a diagram illustrating data on an aspherical surface of the variable-power optical system according to Example 7.

FIG. 23 is a diagram illustrating values regarding conditional expressions of the examples.

FIG. 26 is an aberration diagram illustrating various aberrations at a wide end of the variable-power optical system according to Example 2, where (A) shows spherical aberration, (B) shows astigmatism, (C) shows distortion, and (D) shows lateral chromatic aberration.

FIG. 27 is an aberration diagram illustrating various aberrations at a telephoto end of the variable-power optical system according to Example 2, where (A) shows spherical aberration, (B) shows astigmatism, (C) shows distortion, and (D) shows lateral chromatic aberration.

FIG. 30 is an aberration diagram illustrating various aberrations at a wide end of the variable-power optical system according to Example 4, where (A) shows spherical aberration, (B) shows astigmatism, (C) shows distortion, and (D) shows lateral chromatic aberration.

FIG. 31 is an aberration diagram illustrating various aberrations at a telephoto end of the variable-power optical system according to Example 4, where (A) shows spherical aberration, (3) shows astigmatism, (C) shows distortion, and (D) shows lateral chromatic aberration.

DETAILED DESCRIPTION OF EMBODIMENTS OF THE INVENTION

Figure 2A:
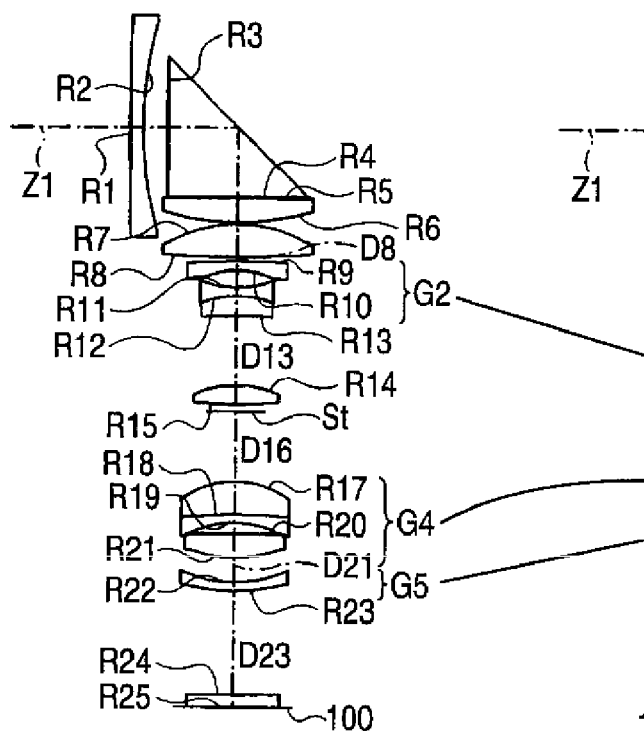
FIG. 2 illustrates a second configuration example of the variable-power optical system according to the embodiment of the invention and is a section view of lenses corresponding to Example 2.

Hereinafter, embodiments of the invention will be described in detail with reference to the accompanying drawings.

FIGS. 1A and 1B show a first configuration example of a variable-power optical system according to an embodiment of the invention. This configuration example corresponds to a lens configuration of a first numerical example (FIGS. 9A, 9B and 10) which will be described later. FIG. 1A shows the optical system arrangement at a wide end (with the shortest focal length) and FIG. 1B shows the optical system arrangement at a telephoto end (with the longest focal length). Similarly, FIGS. 2A and 2B to FIGS. 7A and 7B show section configurations of second to seventh configuration examples corresponding to lens configurations of second to seventh numerical examples which will be described later. In FIGS. 1A and 1B to FIGS. 7A and 7B, reference numeral Ri denotes a curvature radius of an i-th surface when a surface of the most-object-side element is counted as the first surface and the surface number sequentially increases toward an image side (the image formation surface). Reference numeral Di denotes a surface separation between the i-th surface and the (i+1)-th surface on an optical axis Z1. Regarding the reference numeral Di, only reference numerals of the surface separations D8, D13, D16, D21, and D23 which vary along with the variation in magnification are shown in the figures. Since the configuration examples basically have the same configuration, the first configuration example shown in FIGS. 1A and 1B will be described as a basic configuration in the following description.

The variable-power optical system is mounted on a small-sized device having an imaging function, such as a digital still camera, a mobile phone fitted with a camera, and a PDA for use. The variable-power optical system includes, in order from the object side along the optical axis Z1, a first lens group G1 having a positive refractive power, a second lens group G2 having a negative refractive power, a third lens group G3 having a positive refractive power, an aperture stop St that adjusts the light quantity, a fourth lens group G4 having a positive refractive power, and a fifth lens group G5 having a negative refractive power.

An imaging element 100 such as a CCD is disposed in the image formation surface of the variable-power optical system. The imaging device includes at least the variable-power optical system and the imaging element 100. A variety of optical members GC may be disposed between the fifth lens group G5 and the imaging element 100, in accordance with the configuration of the camera on which the lenses are mounted. For example, a flat-panel-shaped optical member such as a cover glass for protecting the imaging surface and/or an IR cut filter may be disposed therebetween.

In the variable-power optical system, the first lens group G1 and the third lens group G3 are fixed at the time of varying the magnification and at the time of focusing. The second lens group G2, the fourth lens group G4, and the fifth lens group G5 move on the optical axis Z1 at the time of varying the magnification. The fourth lens group G4 has a focusing function. The fourth lens group G4 moves on the optical axis Z1 at the time of focusing as well as at the time of varying the magnification. In the variable-power optical system, the moving groups move from the state shown in FIG. 1A to the state shown in FIG. 1B, so as to draw loci indicated by solid lines in the figure. In this case, the second lens group G2 and the fifth lens group G5 move on the optical axis Z1 so as to have difference movement directions in directions different from each other and to perform linear straight-line motion. The fourth lens group G4 moves so as to perform a nonlinear motion. The second lens group G2 and the fifth lens group G5 perform a magnification varying function and the fourth lens group G4 performs a function of correcting variation of the image surface that occurs along with the variation in magnification.

The first lens group G1 includes, in order from the object side, a front group G1$f$ having a negative refractive power, a reflecting member G1$p$ bending an optical path, and a rear group G1$r$ having a positive refractive power. The front group G1$f$ includes, for example, one negative lens L11. The rear group G1$r$ includes, for example, two positive lenses L12 and L13. The reflecting member G1$p$ includes, for example, a right-angle prism LP having an inner reflecting surface serving to bend the optical path about 90°.

For example, The second lens group G2 includes, in order from the object side, a negative lens L21 and a cemented lens having a negative lens L22 and a positive lens L23. The third lens group G3 includes, for example, one positive lens L31. The fourth lens group G4 includes, for example, a cemented lens having two lenses L41 and L42 and a positive lens L43 having a convex surface directed to the object side. The fifth lens group G5 includes, for example, one negative lens L51.

The variable-power optical system satisfies Conditional Expressions (1) and (2). In the expressions, fw represents a focal length of the whole system at a wide end, f1 represents a focal length of the first lens group G1, and f2 represents a focal length of the second lens group G2.

$$0.4 < fw/f1 < 0.8 \quad (1)$$

$$0.5 < |f2/fw| < 0.8 \quad (2)$$

The variable-power optical system preferably satisfies Conditional Expression (3). In the expression, f1f represents a focal length of the front group G1f of the first lens group G1, and f1r represents a focal length of the rear group G1r of the first lens group G1.

$$-3.5 < f1f/f1r < -1.8 \quad (3)$$

Figure 8:
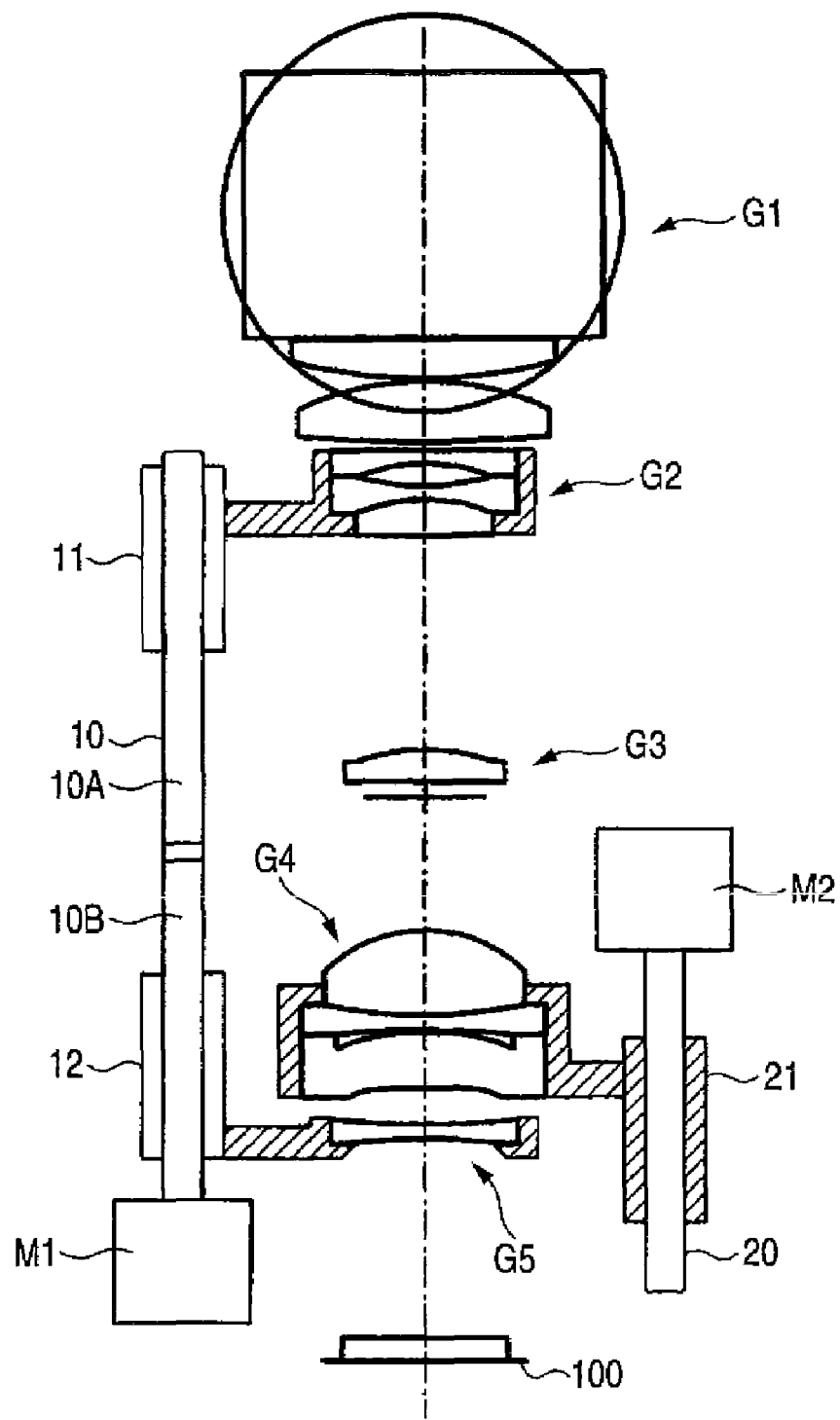
FIG. 8 is a section view illustrating an example of a lens moving mechanism in the variable-power optical system according to the embodiment of the invention.
Figure 24:
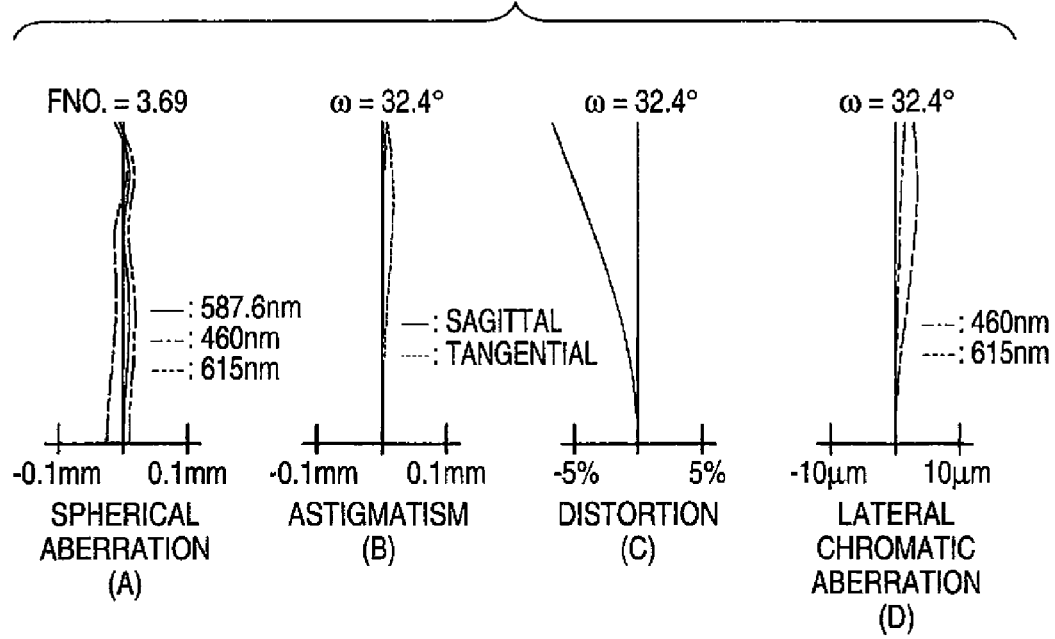
FIG. 24 is an aberration diagram illustrating various aberrations at a wide end of the variable-power optical system according to Example 1, where (A) shows spherical aberration, (B) shows astigmatism, (C) shows distortion, and (D) shows lateral chromatic aberration.
Figure 25:
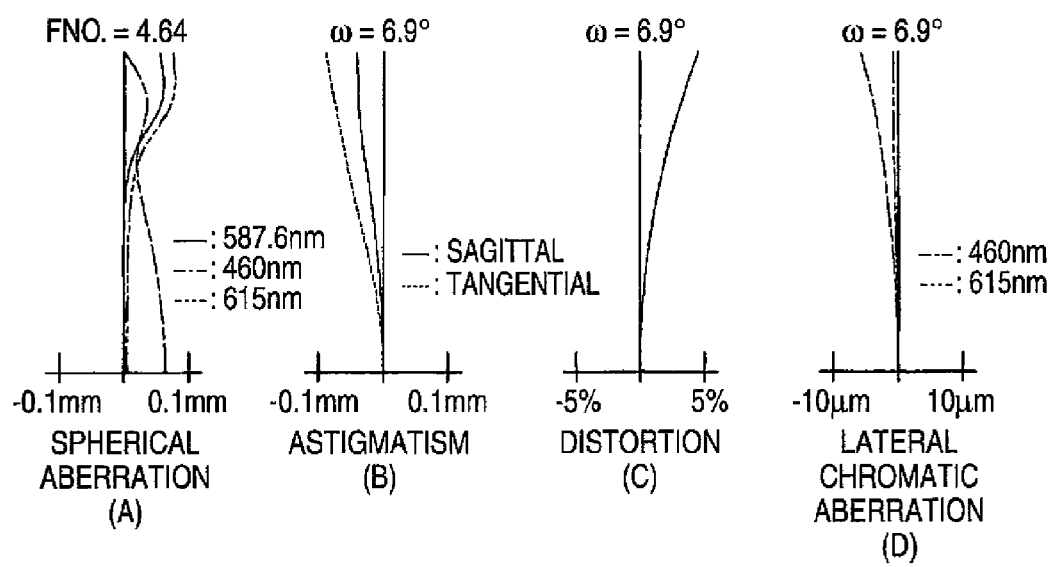
FIG. 25 is an aberration diagram illustrating various aberrations at a telephoto end of the variable-power optical system according to Example 1, where (A) shows spherical aberration, (B) shows astigmatism, (C) shows distortion, and (D) shows lateral chromatic aberration.
Figure 28:
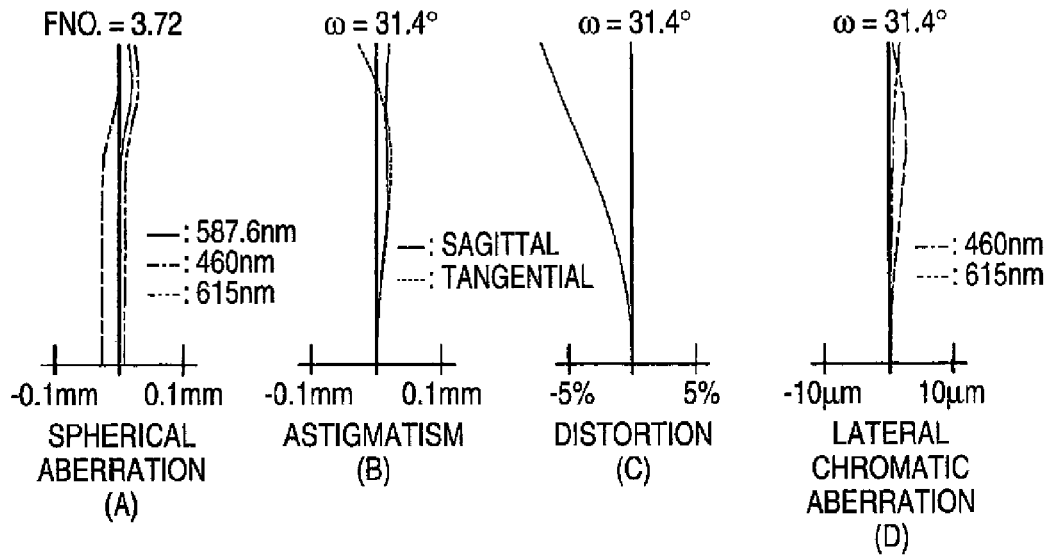
FIG. 28 is an aberration diagram illustrating various aberrations at a wide end of the variable-power optical system according to Example 3, where (A) shows spherical aberration, (B) shows astigmatism, (C) shows distortion, and (D) shows lateral chromatic aberration.
Figure 29:
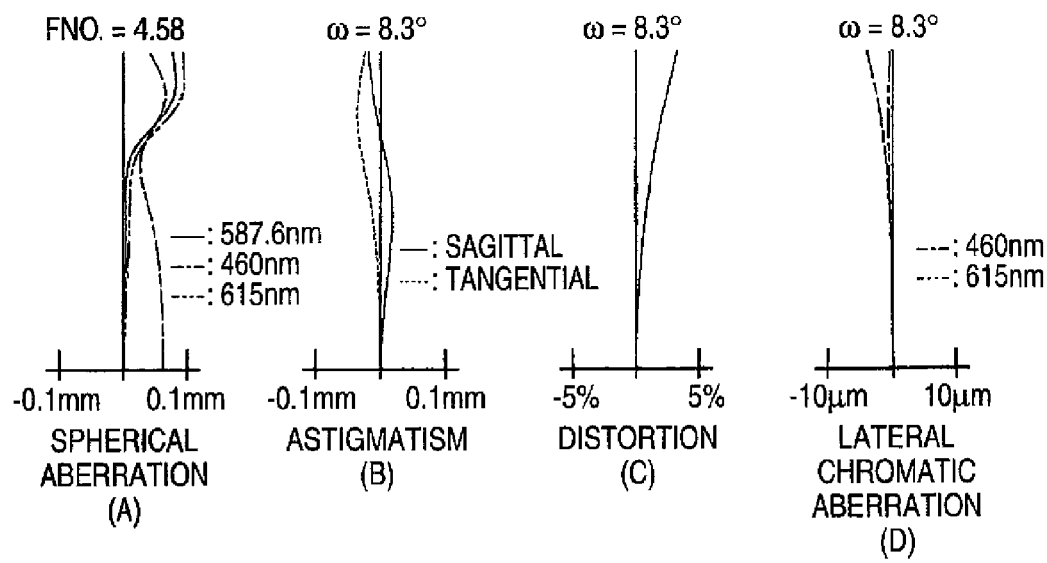
FIG. 29 is an aberration diagram illustrating various aberrations at a telephoto end of the variable-power optical system according to Example 3, where (A) shows spherical aberration, (B) shows astigmatism, (C) shows distortion, and (D) shows lateral chromatic aberration.
Figure 32:
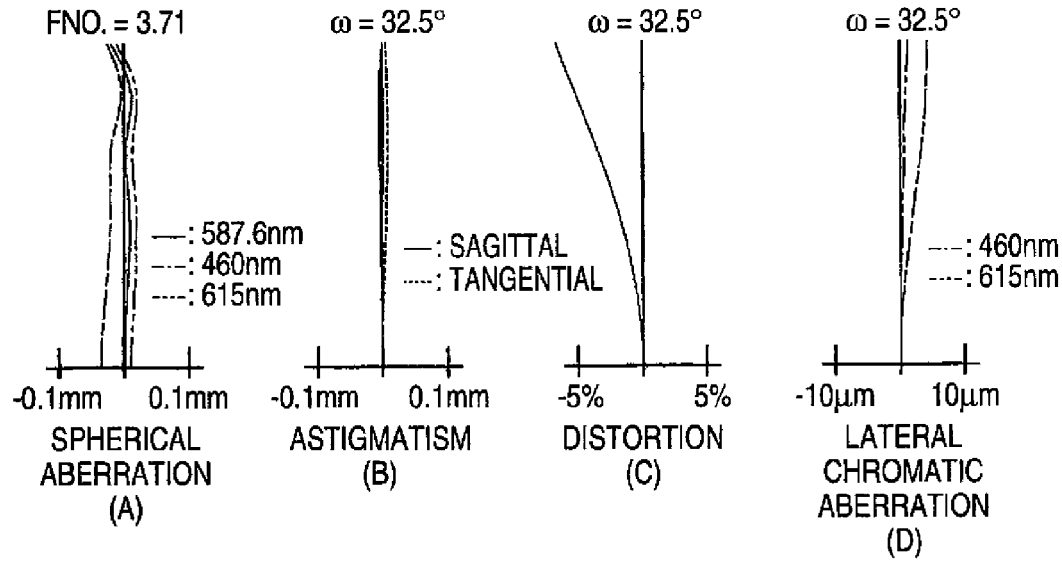
FIG. 32 is an aberration diagram illustrating various aberrations at a wide end of the variable-power optical system according to Example 5, where (A) shows spherical aberration, (B) shows astigmatism, (C) shows distortion, and (D) shows lateral chromatic aberration.
Figure 33:
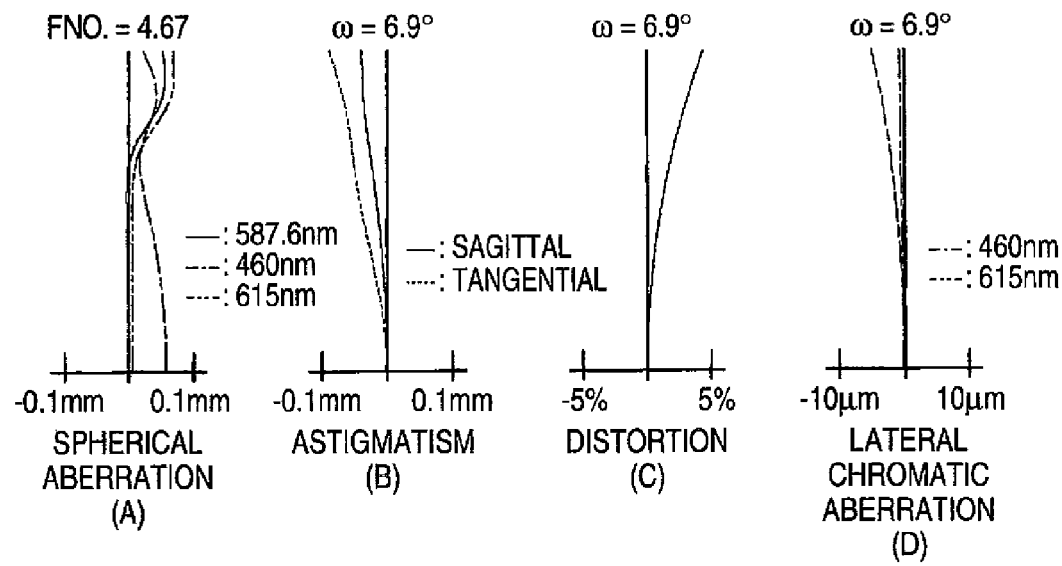
FIG. 33 is an aberration diagram illustrating various aberrations at a telephoto end of the variable-power optical system according to Example 5, where (A) shows spherical aberration, (B) shows astigmatism, (C) shows distortion, and (D) shows lateral chromatic aberration.
Figure 34:
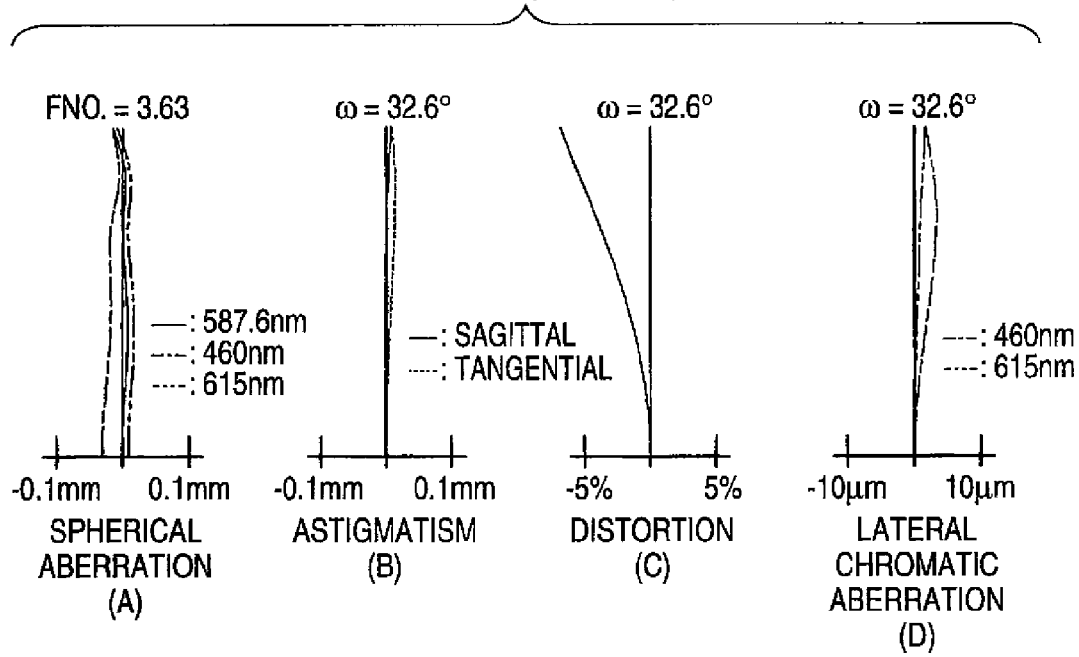
FIG. 34 is an aberration diagram illustrating various aberrations at a wide end of the variable-power optical system according to Example 6, where (A) shows spherical aberration, (B) shows astigmatism, (C) shows distortion, and (D) shows lateral chromatic aberration.
Figure 35:
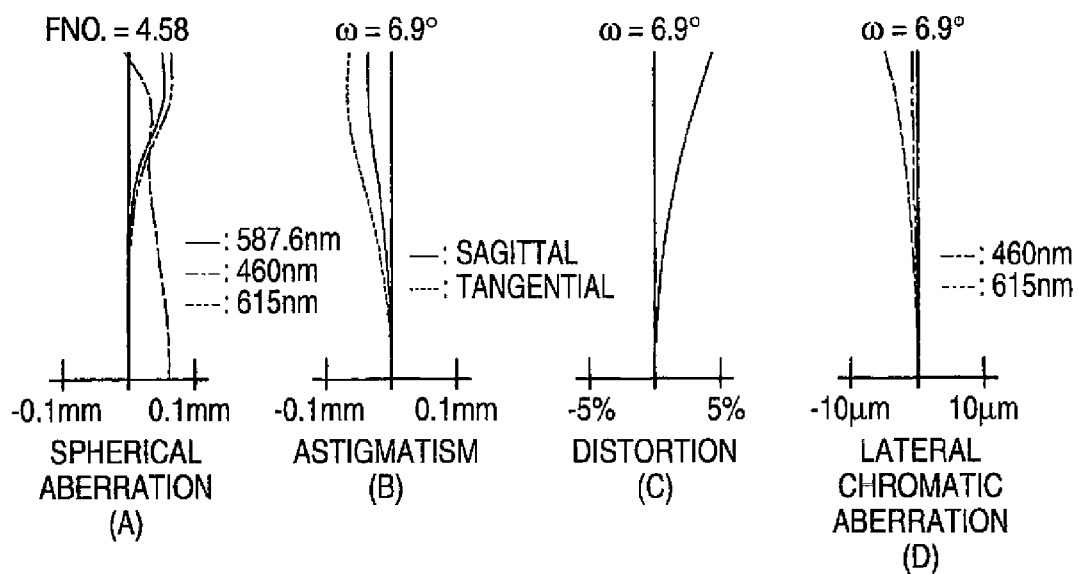
FIG. 35 is an aberration diagram illustrating various aberrations at a telephoto end of the variable-power optical system according to Example 6, where (A) shows spherical aberration, (B) shows astigmatism, (C) shows distortion, and (D) shows lateral chromatic aberration.
Figure 36:
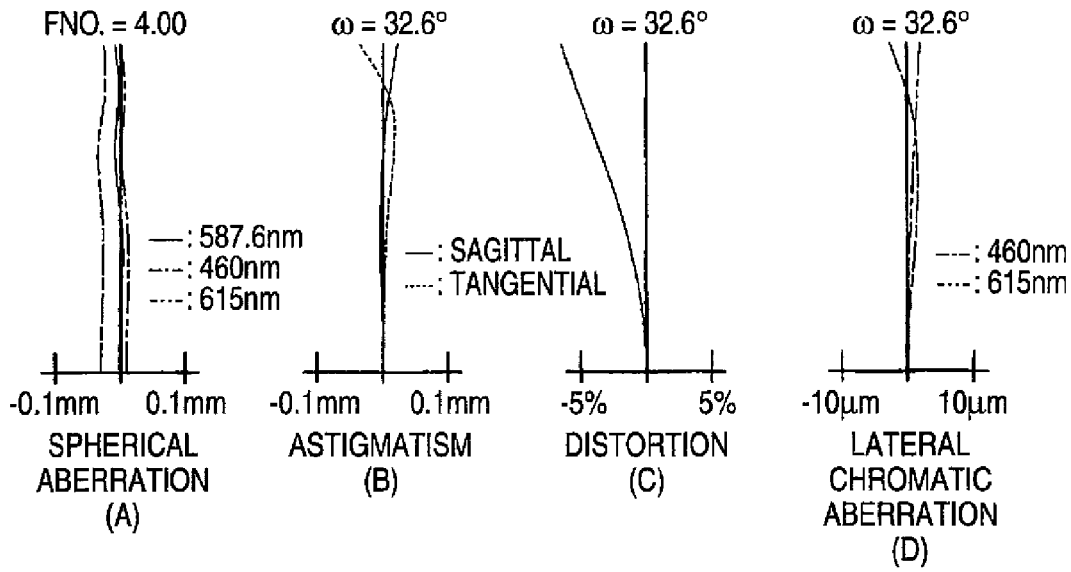
FIG. 36 is an aberration diagram illustrating various aberrations at a wide end of the variable-power optical system according to Example 7, where (A) shows spherical aberration, (B) shows astigmatism, (C) shows distortion, and (D) shows lateral chromatic aberration.
Figure 37:
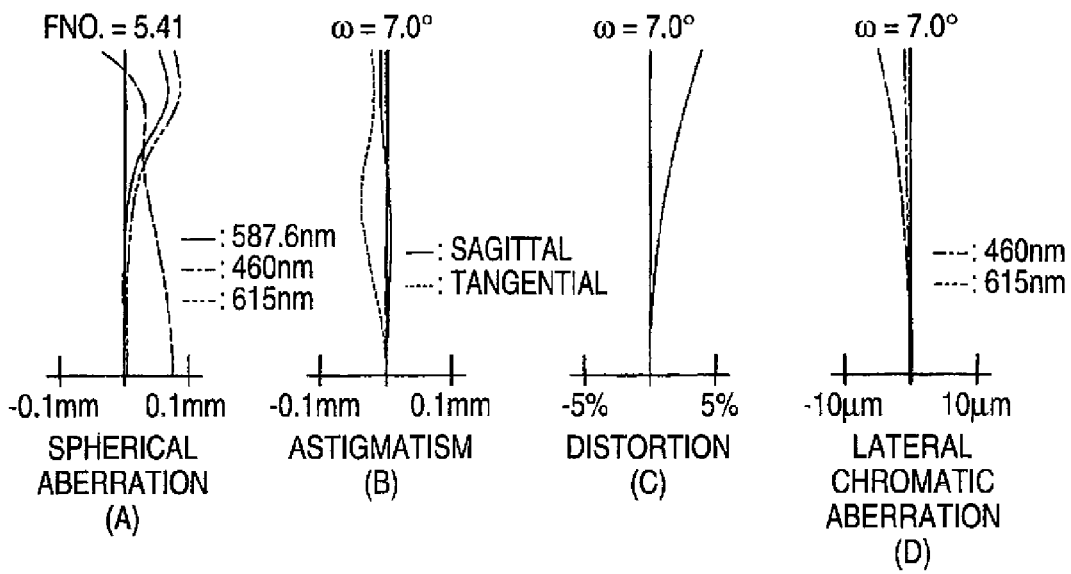
FIG. 37 is an aberration diagram illustrating various aberrations at a telephoto end of the variable-power optical system according to Example 7, where (A) shows spherical aberration, (B) shows astigmatism, (C) shows distortion, and (D) shows lateral chromatic aberration.

FIG. 8 shows a configuration example of a lens moving mechanism of the variable-power optical system. The configuration of the variable-power optical system when viewed from the front side (light incidence side) is shown in FIG. 8. The lens moving mechanism includes a linear moving mechanism that moves the second lens group G2 and the fifth lens group G5 and a nonlinear moving mechanism that moves the fourth lens group G4 in a nonlinear way.

The nonlinear moving mechanism includes a single motor M2, a shaft 20 connected to the motor M2, and a transmission block 21 screwing with the shaft 20. A male screw is formed in the shaft 20. When the shaft 20 rotates along with the rotation of the motor M2, the transmission block 21 screwing with the shaft 20 linearly moves. A lens driving controller (not shown) nonlinearly moves the fourth lens group G4 by controlling the rotation amount of the motor M2.

The linear moving mechanism includes a single motor M1, a shaft 10 connected thereto, and two transmission blocks 11 and 12 screwing with the shaft 10. The motor M1 is driven in accordance with an instruction from the lens driving controller (not shown) to supply a rotary power thereof to the shaft 10. The shaft 10 is disposed parallel to the optical axis of light that is reflected by the right-angle prism LP. A first male screw 10A is formed on a portion corresponding to a moving range of the second lens group G2 and a second male screw 10B is formed on a portion corresponding to a moving range of the fifth lens group G5.

The first male screw 10A and the second mal screw 10B are opposite to each other in screwing direction. That is, when the first male screw 10A is a right-handed screw, the second male screw 10B is a left-handed screw. The first male screw 10A and the second male screw 10B are different from each other in lead distance. Accordingly, the traveling distance of the first male screw 10A and the traveling distance of the second male screw 10B are different from each other when the shaft 10 rotates one turn. The first transmission block 11 screws with the first male screw 10A and the second transmission block 12 screws with the second male screw 10B. The first transmission block 11 is physically connected to the second lens group G2 and the second transmission block 12 is physically connected to the fifth lens group G5. As a result, when the shaft 10 is rotated by the driving of the motor M1, the first transmission block 11 and the second transmission block 12 are linearly driven. At this time, since the first male screw 10A and the second male screw 10B are opposite to each other in screwing direction, the screwed first transmission block 11 and the screwed second transmission block 12 move in the directions opposite to each other. Thus, the second lens group G2 and the fifth lens group G5, which are physically connected to the first transmission block 11 and the second transmission block 12, move in the opposite directions. Since the first male screw 10A and the second male screw 10B are different from each other in leading distance, the moving distances of the first transmission block 11 and the second transmission block 12 are different from each other. Thus, the moving distances of the second lens group G2 and the fifth lens group G5 are different from each other. As a result, only by driving the single motor M1, it is possible to move the second lens group G2 and the fifth lens group G5 in desired directions by desired moving distances to perform a linear straight-line motion.

In the lens moving mechanism, an operation of varying a focal length by the second lens group G2 and the fifth lens group G5 and an operation of correcting a position of the image surface by the fourth lens group G4 are separated from each other. Accordingly, it is possible to simplify the moving mechanisms of the second lens group G2 and the fifth lens group G5, thereby reducing the cost or saving the space. It should be noted that the linear moving mechanism shown in FIG. 8 is one example. Any other type may be employed so long as it can linearly move the second lens group G2 and the fifth lens group G5. For example, in the above-mentioned example, the transmission mechanism having the shaft 10 and the transmission blocks 11 and 12 is used. However, any other transmission mechanism may be used so long as it can simultaneously transmit the driving power of the single motor M1 to the two lens groups G2 and G5 as linear motions different in moving direction and in moving distance. For example, a transmission mechanism may have two kinds of pinions that are different from each other in pitch and that are connected to the rotation shaft of the motor, and two kinds of racks that engage with the two kinds of pinions.

Next, operations and advantages of the variable-power optical system having the above-mentioned configuration will be described.

The variable-power optical system has a five-group configuration as a whole and the second lens group G2, the fourth lens group G4, and the fifth lens group G5 are moved at the time of varying the magnification. Therefore, it is advantageous in increase of a variable-magnification ratio. Since the focal lengths of the first lens group G1 and the second lens group G2 satisfy Conditional Expressions (1) and (2), it is possible to reduce the total length of lenses while excellent optical performance is kept, thereby easily reducing the size.

Conditional Expression (1) is an expression regarding the focal length f1 of the first lens group G1. When the expression is satisfied, the optical system can be reduced in size and the aberration in the whole magnification varying range can be corrected well. If fw/f1 falls below the lower limit of Conditional Expression (1), the refractive power of the first lens group G1 gets small. Accordingly, since the total length of lenses becomes long and the outer diameter of the first lens group G1 including the reflective member G1p is enlarged, it is not possible to reduce the size of the optical system. When fw/f1 exceeds the upper limit of Conditional Expression (1), the refractive power of the first lens group G1 gets strong. Therefore, it is advantageous in decrease of size of the optical system. However, aberration in the first lens group G1 increases. As a result, it becomes difficult to correct the aberration in the whole magnification varying range well.

Conditional Expression (2) is an expression regarding the focal length f2 of the second lens group G2. When the expression is satisfied, the optical system can be reduced in size and the aberration in the whole magnification varying range can be corrected well. When |f2/fw| falls below the lower limit of Conditional Expression (2), the refractive power of the second lens group G2 gets strong. It is advantageous in decrease of size. However, aberration in the second lens group G2 increases. As a result, it becomes difficult to correct the aberration in the whole magnification varying range well. If |f2/fw| exceeds the upper limit of Conditional Expression (2), the refractive power of the second lens group G2 gets small. The aberration in the second lens group G2 is reduced. However, the total length of lenses gets long. As a result, it is not possible to reduce the size.

In the variable-power optical system, an object beam incident on the first lens group G1 is bent about 90° toward the second lens group G2 by the inner reflecting surface of the right-angle prism LP, and forms an image on the imaging element 100 disposed so as to be perpendicular to the incidence surface of the first lens group G1. With such a bending-type optical system, it is possible to reduce the length of the optical system in the thickness direction while the excellent optical performance is kept, thereby reducing the thickness when the optical system is built in an imaging device. In the configuration of the bending-type optical system, the first lens group G1 includes, in order from the object side, the front group G1$f$ having the negative refractive power, the reflecting member G1$p$ bending the optical path, and the rear group G1$r$ having the positive refractive power. The front group G1$f$ having the negative refractive power is disposed in front of the reflecting member G1$p$. Therefore, it is possible to reduce the size of the reflecting member G1$p$, thereby accomplishing the decrease in thickness of the optical system.

Conditional Expression (3) is an expression regarding the focal length f1$f$ of the front group G1$f$ having the negative refractive power and the focal length f1$r$ of the rear group G1$r$ having the positive refractive power in the first lens group G1. When the expression is satisfied, it is possible to accomplish decrease in outer diameter of the first lens group G1 including the reflecting member G1$p$ and decrease in total length of lenses. If f1$f$/f1$r$ falls below the lower limit of Conditional Expression (3), the refractive power of the front group G1$f$ of the first lens group G1 gets small. Since a diameter of a light flux passing through the reflecting member G1$p$ becomes large, the outer diameter of the first lens group G1 including the reflecting member G1$p$ becomes large. If f1$f$/f1$r$ exceeds the upper limit of Conditional Expression (3), the refractive power of the rear group G1$r$ of the first lens group G1 gets small. Thus, the total length of lenses becomes long.

In the variable-power optical system, when the second lens group G2 and the fifth lens group G5 are moved at the time of varying the magnification, they are moved in the different moving directions to perform the linear straight-line motion. Accordingly, at the time of moving the second lens group G2 and the fifth lens group G5, both groups can be moved by the single motor M1 as shown in FIG. 8. Accordingly, it is possible to reduce the number of motors required for respective moving lens groups and to simplify the movement control, thereby reducing the size and cost of the imaging device including the mechanism. Since the fourth lens group G4 is moved at the time of focusing, the variation in exit pupil distance becomes small at the time of focusing, thereby reducing the variation in shading. Compared with a method of moving the fifth lens group G5, which is closest to the image surface at the time of focusing, the dust or scratches attached to the lens surfaces of the fifth lens group G5 hardly affects the image quality.

In the variable-power optical system, at least one plastic lens may be included in each of the first to fifth lens groups G1 to G5. With this configuration, it is possible to reduce the weight and the cost of the optical system. In this case, it is preferable that a plastic lens is used as at least one positive lens of the rear group G1$r$ of the first lens group G1 and a plastic lens is used as at least one negative lens of the second lens group G2. The plastic lens is larger in variation of the refractive index and in expansion rate at a time of temperature variation, than a glass lens. Accordingly, when a lot of plastic lenses are used, the movement of the focal point increases at the time of temperature variation. However, by using the plastic lens as at least one positive lens of the rear group G1$r$ of the first lens group G1 and using the plastic lens as at least one negative lens of the second lens group G2, it is possible to reduce the movement of the focal point at the time of temperature variation.

As described above, by employing the variable-power optical system according to this embodiment, it is possible to reduce the total length of lenses while the excellent optical performance is kept, thereby reducing the size of the optical system. In the imaging device according to this embodiment, since the imaging signals corresponding to the optical image formed by the variable-power optical system with high performance according to this embodiment are output it is possible to obtain imaging signals with high resolution.

EXAMPLES

Next, specific numerical examples of the variable-power optical system according to this embodiment will be described. Hereinafter, first to seventh numerical examples will be described.

FIGS. 9A and 9B and FIG. 10 show specific lens data corresponding to the variable-power optical system shown in FIGS. 1A and 1B. Particularly, the basic lens data is shown in FIG. 9A and the other data are shown in FIGS. 9B and 10. The surface number Si in the lens data shown in FIG. 9A denotes the number of the i-th (where i=1 to 25) surface in the variable-power optical system according to Example 1 when the surface of the most-object-side element is counted as the first surface and the surface number sequentially increases toward the image side. The curvature radius Ri denotes a curvature radius (mm) of the i-th surface from the object side so as to correspond to reference numeral Ri shown in FIG. 1. The surface separation Di denotes a separation (mm) between the i-th surface Si from the object side and the (i+1)-th surface Si+1 on the optical axis. Reference numeral Ndi denotes a refractive index at the d-line (587.6 nm) between the i-th surface Si from the object side and the (i+1)-th surface Si+1. Reference numeral vdj denotes Abbe number of the j-th optical element from the object side at the d-line. Paraxial focal lengths f (mm) of the whole system at the wide end and the telephoto end, F numbers (FNO.), and viewing angles 2ω (ω is a semi viewing angle) are shown as various data in FIG. 9A.

In the variable-power optical system according to Example 1, since the second lens group G2, the fourth lens group G4, and the fifth lens group G5 move on the optical axis along with the variation in magnification, the surface separations D8, D13, D16, D21, and D23 before and after these groups are variable. In FIG. 9B, values at the wide end and the telephoto end are shown as the data of the surface separations D8, D13, D16, D21, and D23 at the time of varying the magnification.

In the lens data shown in FIG. 9A, sign "*" attached to the left of the surface number means that that lens surface is aspheric. In the variable-power optical system according to Example 1, both surfaces S7 and S8 of the lens L13 of the first lens group G1, both surfaces S14 and S15 of the lens L31 of the third lens group G3, and both surfaces S20 and S21 of the lens L43 of the fourth lens group G4 are all aspheric. In the basic lens data shown in FIG. 9A, numerical values of the curvature radii in the vicinity of the optical axis are shown as the curvature radii of the aspheric surfaces.

FIG. 10 shows aspheric data of the variable-power optical system according to Example 1. In the numerical values shown as the aspheric data, sign "E" denotes that a numerical value subsequent thereto is an "exponent" having 10 as its base and represents that a numerical value expressed by an exponential function having 10 as its base is multiplied by a numerical value in front of "E." For example, "1.0E–02" represents "$1.0 \times 10^{-2}$."

Values of coefficients $A_n$ and K in an aspheric expression expressed by the following expression A are shown as the aspheric data of the variable-power optical system according to Example 1. More specifically, Z denotes a length (mm) of a perpendicular line connecting a point on the aspheric surface located at a height Y from the optical axis to a tangential plane (plane perpendicular to the optical axis) of a vertex of the aspheric surface.

In the variable-power optical system according to Example 1, coefficients of $A_3$ to $A_{20}$ are properly and effectively used as the aspheric coefficient $A_n$.

$$Z = C \cdot Y^2 / \{1 + (1 - K \cdot C^2 \cdot Y^2)^{1/2}\} + \Sigma A_n \cdot Y^n \quad (A)$$

where n denotes an integer equal to or greater than 3,

Z denotes a depth (mm) of the aspheric surface,

Y denotes a distance (height) (mm) from the optical axis to the lens surface,

K denotes an eccentricity,

C denotes a paraxial curvature=1/R (where R is a paraxial curvature radius), and $A_n$ denotes an n-th order aspheric coefficient.

Figure 2B:
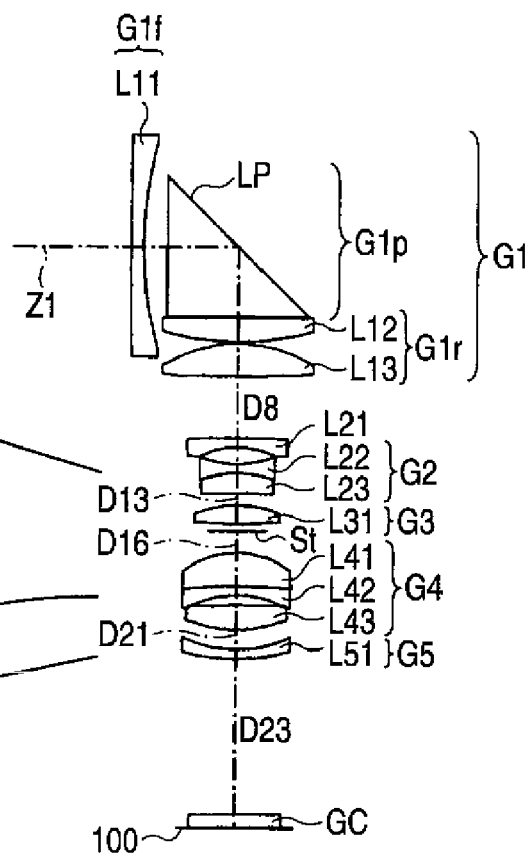
Figures 7A, 7B:
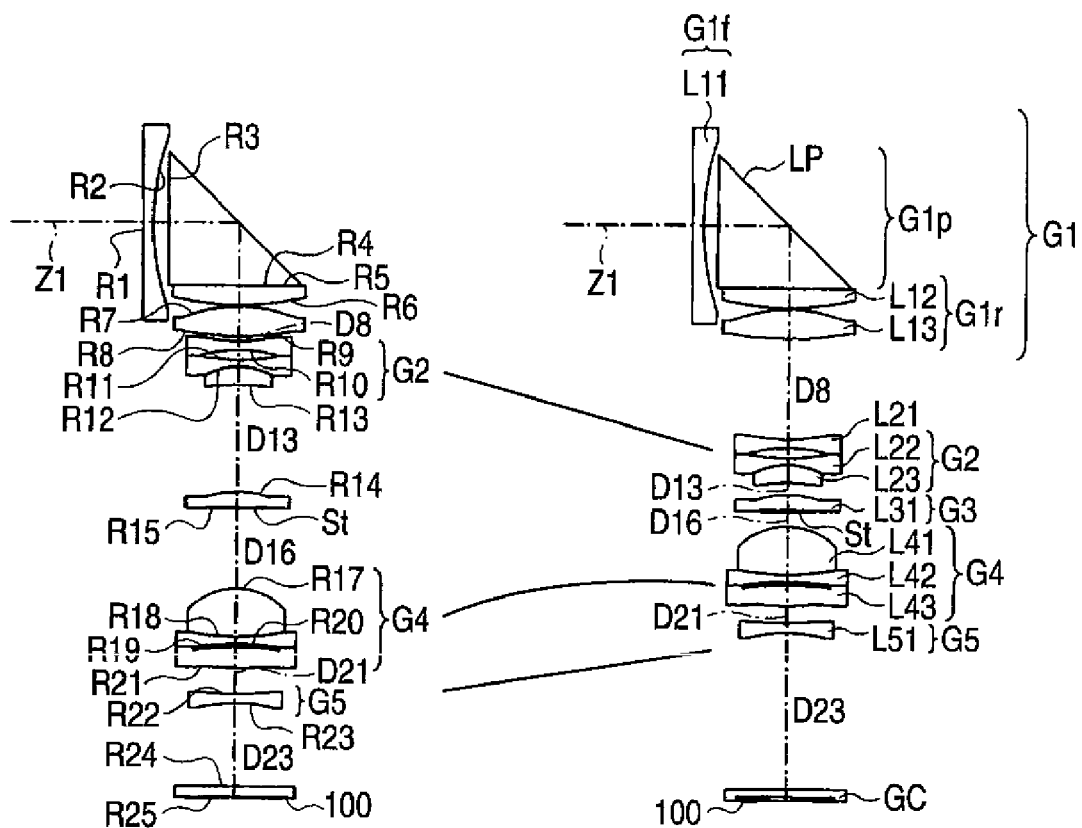
FIG. 7 illustrates a seventh configuration example of the variable-power optical system according to the embodiment of the invention and is a section view of lenses corresponding to Example 7.

Similarly to the variable-power optical system according to Example 1, specific lens data corresponding to the configuration of the variable-power optical system shown in FIGS. 2A and 2B are shown as Example 2 in FIGS. 11A, 11B, and 12. Similarly, specific lens data corresponding to the configuration of the variable-power optical system shown in FIGS. 3A and 3B are shown as Example 3 in FIGS. 13A, 13B, and 14. Similarly, specific lens data corresponding to the configuration of the variable-power optical system shown in FIGS. 4A and 4B are shown as Example 4 in FIGS. 15A, 15B, and 16. Similarly, specific lens data corresponding to the configuration of the variable-power optical system shown in FIGS. 5A and 5B are shown as Example 5 in FIGS. 17A, 17B, and 18. Similarly, specific lens data corresponding to the configuration of the variable-power optical system shown in FIGS. 6A and 6B are shown as Example 6 in FIGS. 19A, 19B, and 20. Similarly, specific lens data corresponding to the configuration of the variable-power optical system shown in FIGS. 7A and 7B are shown as Example 7 in FIGS. 21A, 21B, and 22.

In the variable-power optical system according to Examples 2 to 6, similarly to the variable-power optical system according to Example 1, both surfaces S7 and S8 of the lens L13 of the first lens group G1, both surfaces S14 and S15 of the lens L31 of the third lens group G3, and both surfaces S20 and S21 of the lens L43 of the fourth lens group G4 are all aspheric.

In the variable-power optical system according to Example 7, similarly to the variable-power optical system according to Example 1, both surfaces S7 and S8 of the lens L13 of the first lens group G1, both surfaces S14 and S15 of the lens L31 of the third lens group G3, and both surfaces S20 and S21 of the lens L43 of the fourth lens group G4 are all aspheric. Furthermore, in the variable-power optical system according to Example 7, both surfaces S9 and S10 of the lens L21 of the second lens group G2 are aspheric. Also, in the variable-power optical system according to Example 7, one plastic lens is included in each of the first to fifth lens groups G1 to G5. Specifically, plastic lenses are used as the positive lens L13 of the rear group G1r of the first lens group G1, the negative lens L21 of the second lens group G2, the positive lens L31 of the third lens group G3, the positive lens L43 of the fourth lens group G4, and the negative lens L51 of the fifth lens group G5.

In FIG. 23, the values of the conditional expressions of the respective examples are collectively shown. As can be seen from FIG. 23, the values of each example are within the numerical ranges defined by the conditional expressions.

FIGS. 24A to 24D show spherical aberration, astigmatism, distortion, and lateral chromatic aberration at the wide end of the variable-power optical system according to Example 1. FIGS. 25A to 25D show the respective aberrations at the telephoto end. In the respective aberration diagrams, aberrations are shown with the d-line (587.6 nm) being used as a reference wavelength. In the diagrams of spherical aberration and lateral chromatic aberration, aberrations at wavelengths 460 nm and 615 nm are also shown. In the diagram of astigmatism aberration, the solid line indicates the aberration in the sagittal direction and the dotted line indicates the aberration in the tangential direction. FNO. denotes a value of F and ω denotes the semi viewing angle.

Similarly, the respective aberrations of the variable-power optical system according to Example 2 are shown in FIGS. 26A to 26D (wide end) and FIGS. 27A to 27D (telephoto end). Similarly, the respective aberrations of the variable-power optical system according to Example 3 are shown in FIGS. 28A to 28D (wide end) and FIGS. 29A to 29D (telephoto end). Similarly, the respective aberrations of the variable-power optical system according to Example 4 are shown in FIGS. 30A to 30D (wide end) and FIGS. 31A to 31D (telephoto end). Similarly, the respective aberrations of the variable-power optical system according to Example 5 are shown in FIGS. 32A to 32D (wide end) and FIGS. 33A to 33D (telephoto end). Similarly, the respective aberrations of the variable-power optical system according to Example 6 are shown in FIGS. 34A to 34D (wide end) and FIGS. 35A to 35D (telephoto end). Similarly, the respective aberrations of the variable-power optical system according to Example 7 are shown in FIGS. 36A to 36D (wide end) and FIGS. 37A to 37D (telephoto end).

As can be seen from the numerical data and the aberration diagrams, according to the examples, the respective aberrations are corrected well and the total length of lenses are reduced while the excellent optical performance is kept, thereby reducing the size. Accordingly, the variable-power optical system suitable for being mounted on an imaging device and being reduced in thickness is embodied.

The invention is not limited to the embodiments and the examples, but may be modified in various ways. For example, the curvature radii, the surface separations, and the refractive indexes of the lens components are not limited to the above-mentioned values, but may have different values.

What is claimed is:

1. A variable-power optical system comprising, in order from an object side:
 a first lens group that is fixed at a time of varying magnification and at a time of focusing and that has a positive refractive power;
 a second lens group that is movable at the time of varying the magnification and that has a negative refractive power;
 a third lens group that is fixed at the time of varying the magnification and at the time of focusing and that has a positive refractive power;
 a fourth lens group that is movable at the time of varying the magnification, that has a focusing function, and that has a positive refractive power; and
 a fifth lens group that is movable at the time of varying the magnification and that has a negative refractive power, wherein
 the following conditional expressions are satisfied:

$$0.4 < fw/f1 < 0.8 \quad (1)$$

$$0.5 < |f2/fw| < 0.8 \quad (2)$$

where fw denotes a focal length of the whole system at a wide end,
 f1 denotes a focal length of the first lens group, and
 f2 denotes a focal length of the second lens group.

2. The variable-power optical system according to claim 1, wherein
 the first lens group comprises, in order from the object side,
  a front group having a negative refractive power,
  a reflecting member that bends an optical path, and
  a rear group having a positive refractive power, and
 the following conditional expression is satisfied:

$$-3.5 < f1f/f1r < -1.8 \quad (3)$$

where f1f denotes a focal length of the front group of the first lens group, and
 f1r denotes a focal length of the rear group of the first lens group.

3. The variable-power optical system according to claim 1, wherein
 the second lens group and the fifth lens group move on an optical axis so as to have difference movement directions from each other and to perform a linear straight-line motion, and
 the fourth lens group moves to perform a nonlinear motion.

4. The variable-power optical system according to claim 1, wherein each of the first lens group to the fifth lens group comprises at least one plastic lens.

5. The variable-power optical system according to claim 2, wherein
 the rear group of the first lens group comprises at least one positive lens,
 the second lens group comprises at least one negative lens,
 a plastic lens is used as the at least one positive lens of the rear group of the first lens group, and
 a plastic lens is used as the at least one negative lens of the second lens group.

6. An imaging device comprising:
 the variable-power optical system according to claim 1; and
 an imaging element that outputs an imaging signal corresponding to an optical image formed by the variable-power optical system.

7. The variable-power optical system according to claim 2, wherein
 the second lens group and the fifth lens group move on an optical axis so as to have difference movement directions from each other and to perform a linear straight-line motion, and
 the fourth lens group moves to perform a nonlinear motion.

8. The variable-power optical system according to claim 7, wherein each of the first lens group to the fifth lens group comprises at least one plastic lens.

9. The variable-power optical system according to claim 8, wherein
 the rear group of the first lens group comprises at least one positive lens,
 the second lens group comprises at least one negative lens,
 a plastic lens is used as the at least one positive lens of the rear group of the first lens group, and
 a plastic lens is used as the at least one negative lens of the second lens group.

10. An imaging device comprising:
 the variable-power optical system according to claim 9; and
 an imaging element that outputs an imaging signal corresponding to an optical image formed by the variable-power optical system.

11. A variable-power optical system comprising, in order from an object side:
 a first lens group that is fixed at a time of varying magnification and at a time of focusing and that has a positive refractive power;
 a second lens group that is movable at the time of varying the magnification and that has a negative refractive power;
 a third lens group that is fixed at the time of varying the magnification and at the time of focusing and that has a positive refractive power;
 a fourth lens group that is movable at the time of varying the magnification, that has a focusing function, and that has a positive refractive power; and
 a fifth lens group that is movable at the time of varying the magnification and that has a negative refractive power, wherein
 the first lens group comprises, in order from the object side,
  a front group having a negative refractive power,
  a reflecting member that bends an optical path, and
  a rear group having a positive refractive power, and
 the following conditional expression is satisfied:

$$-3.5 < f1f/f1r < -1.8 \quad (3)$$

where f1f denotes a focal length of the front group of the first lens group, and
 f1r denotes a focal length of the rear group of the first lens group.

12. The variable-power optical system according to claim 11, wherein the following conditional expression is satisfied:

$$0.5 < |f2/fw| < 0.8 \quad (2)$$

where fw denotes a focal length of the whole system at a wide end, and
 f2 denotes a focal length of the second lens group.

13. The variable-power optical system according to claim 11, wherein
 the second lens group and the fifth lens group move on an optical axis so as to have difference movement directions from each other and to perform a linear straight-line motion, and
 the fourth lens group moves to perform a nonlinear motion.

14. The variable-power optical system according to claim 11, wherein each of the first lens group to the fifth lens group comprises at least one plastic lens.

15. The variable-power optical system according to claim 11, wherein
 the rear group of the first lens group comprises at least one positive lens,
 the second lens group comprises at least one negative lens,
 a plastic lens is used as the at least one positive lens of the rear group of the first lens group, and
 a plastic lens is used as the at least one negative lens of the second lens group.

16. An imaging device comprising:
 the variable-power optical system according to claim 11; and
 an imaging element that outputs an imaging signal corresponding to an optical image formed by the variable-power optical system.

17. The variable-power optical system according to claim 12, wherein
 the second lens group and the fifth lens group move on an optical axis so as to have difference movement directions from each other and to perform a linear straight-line motion, and
 the fourth lens group moves to perform a nonlinear motion.

18. The variable-power optical system according to claim 17, wherein each of the first lens group to the fifth lens group comprises at least one plastic lens.

19. The variable-power optical system according to claim 18, wherein
 the rear group of the first lens group comprises at least one positive lens,
 the second lens group comprises at least one negative lens,
 a plastic lens is used as the at least one positive lens of the rear group of the first lens group, and
 a plastic lens is used as the at least one negative lens of the second lens group.

20. An imaging device comprising:
 the variable-power optical system according to claim 19; and
 an imaging element that outputs an imaging signal corresponding to an optical image formed by the variable-power optical system.

* * * * *